United States Patent
Ryan

(10) Patent No.: US 8,733,519 B2
(45) Date of Patent: May 27, 2014

(54) LINEAR IMPELLED MODULE DAMPER

(75) Inventor: Jeffrey Scott Ryan, Willow Spring, NC (US)

(73) Assignee: JRI Development Group, LLC, Mooresville, NC (US)

( * ) Notice: Subject to any disclaimer, the term of this patent is extended or adjusted under 35 U.S.C. 154(b) by 429 days.

(21) Appl. No.: 12/610,652

(22) Filed: Nov. 2, 2009

(65) Prior Publication Data

US 2010/0187059 A1 Jul. 29, 2010

Related U.S. Application Data

(60) Provisional application No. 61/205,762, filed on Jan. 23, 2009.

(51) Int. Cl.
*F16F 9/34* (2006.01)

(52) U.S. Cl.
USPC ..................... 188/266.6; 188/322.2

(58) Field of Classification Search
CPC .................. F16F 9/46; F16F 9/20; F16F 9/44
USPC ........ 188/266.6, 282.4, 285, 310, 315, 322.2, 188/318, 322.13, 314
See application file for complete search history.

(56) References Cited

U.S. PATENT DOCUMENTS

| | | | | |
|---|---|---|---|---|
| 1,160,976 A * | 11/1915 | Myers | ........................... | 188/285 |
| 2,950,785 A | 8/1960 | Patriquin | | |
| 3,107,753 A * | 10/1963 | Georgette | ..................... | 188/313 |
| 3,821,970 A * | 7/1974 | Affa | ................................ | 138/89 |
| 4,184,516 A * | 1/1980 | Oesterritter et al. | ........ | 138/96 R |
| 4,280,600 A * | 7/1981 | Salmon et al. | ................. | 188/312 |
| 4,477,062 A | 10/1984 | Smeltzer et al. | | |
| 4,805,923 A | 2/1989 | Soltis | | |
| 4,817,766 A * | 4/1989 | Nilsson | .......................... | 188/281 |
| 4,821,849 A * | 4/1989 | Miller | ............................ | 188/280 |
| 4,887,515 A * | 12/1989 | Tabata | ............................... | 92/80 |
| 4,926,983 A | 5/1990 | Taubitz et al. | | |
| 5,113,980 A | 5/1992 | Furrer et al. | | |
| 5,293,968 A | 3/1994 | Schuelke et al. | | |
| 5,460,355 A * | 10/1995 | Danek | ........................... | 267/221 |
| 5,558,190 A * | 9/1996 | Chang | ............................ | 188/312 |
| 5,586,627 A * | 12/1996 | Nezu et al. | .................. | 188/266.6 |
| 6,112,868 A | 9/2000 | Graham et al. | | |
| 6,216,831 B1 * | 4/2001 | Taylor | ............................ | 188/280 |
| 6,260,677 B1 | 7/2001 | Hayakawa et al. | | |
| 6,334,517 B1 | 1/2002 | De Frenne | | |
| 6,491,146 B1 | 12/2002 | Yi et al. | | |
| 6,938,365 B2 * | 9/2005 | Wright | ............................. | 37/403 |

(Continued)

*Primary Examiner* — Xuan Lan Nguyen

(74) *Attorney, Agent, or Firm* — Jeffrey C. Watson; Balser & Grell IP Law

(57) ABSTRACT

A linear impelled module damper includes a hollow cylinder having an inner body, an outer body, and a channel between the inner and outer body. The hollow cylinder has a sealed first end and a sealed second end. A piston movable within the hollow cylinder divides the hollow cylinder into a compression chamber and a rebound chamber. The channel communicates with the rebound chamber through at least one hole in the rebound chamber. A compression extension cylinder is rigidly fixed to the hollow cylinder approximate to the sealed second end on one end, and having a compression mount attached to the other end. The compression extension cylinder including an air valve being adapted to allow a piston rod to move in and out of the compression extension cylinder. The piston rod including a rebound mount on one end and extending into the compression extension cylinder on the other.

19 Claims, 16 Drawing Sheets

(56) References Cited

U.S. PATENT DOCUMENTS

| | | | |
|---|---|---|---|
| 7,152,630 B2* | 12/2006 | Krywitsky | 138/89 |
| 7,946,163 B2* | 5/2011 | Gartner | 73/117.03 |
| 2006/0102440 A1* | 5/2006 | Nygren et al. | 188/314 |
| 2006/0113834 A1* | 6/2006 | Hanawa | 303/119.1 |
| 2008/0250844 A1 | 10/2008 | Gartner | |

* cited by examiner

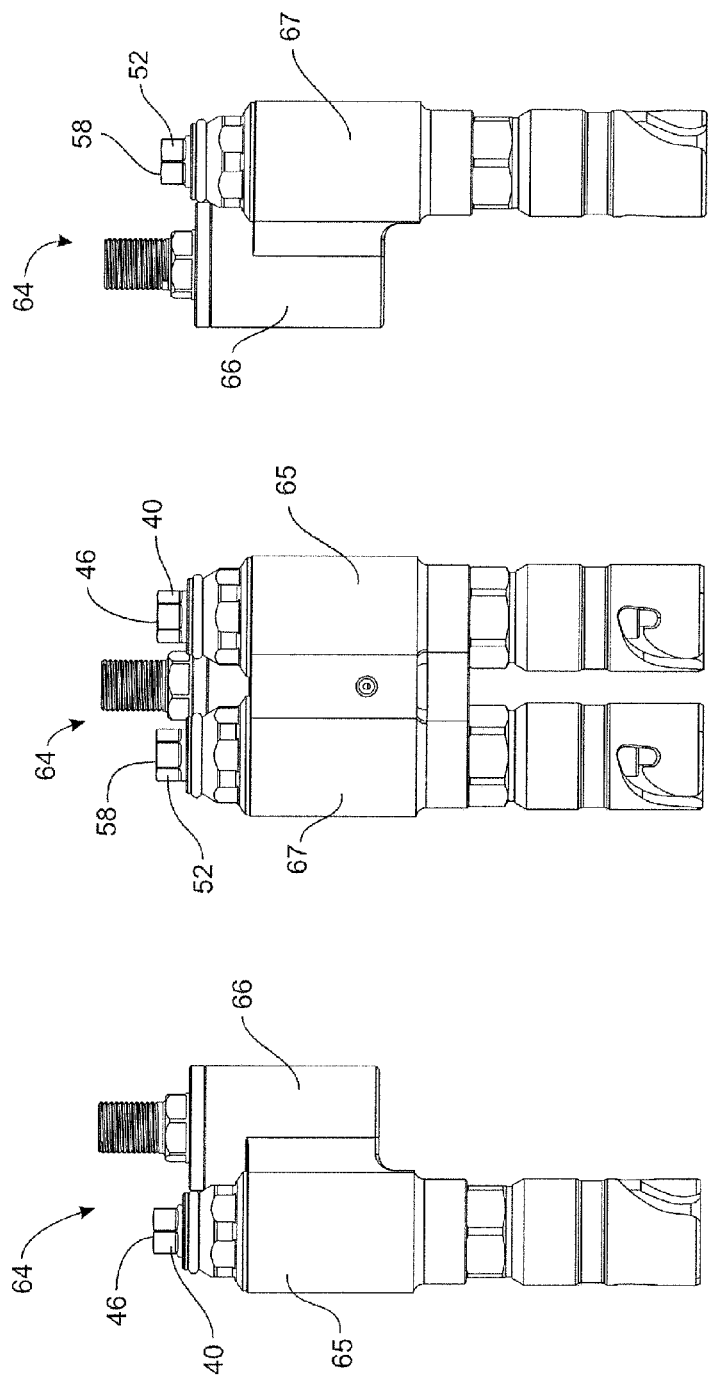
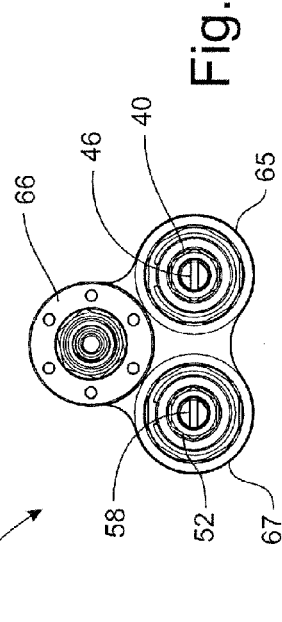

LINEAR IMPELLED MODULE DAMPER

CROSS-REFERENCE TO RELATED APPLICATIONS

This application claims priority to U.S. Provisional Patent Application Ser. No. 61/205,762, filed Jan. 23, 2009, which is incorporated herein by reference.

FIELD OF INVENTION

The instant invention relates to hydraulic dampers or shock absorbers, more specifically, the instant invention relates to dual-action hydraulic dampers that can be used on any type of vehicle. The hydraulic damper is specifically useful on vehicles such as automobiles.

BACKGROUND OF THE INVENTION

Dual-acting hydraulic dampers, also known as shock absorbers, may be utilized to damp the external forces applied to a vehicle, like an automobile. Dual-acting dampers refer to dampers that are effective in damping both the compression and the rebound of the damper. Compression refers to the damper shortening or compressing. Rebound refers to the damper lengthening or rebounding.

Dual-acting hydraulic dampers used on vehicles typically include a hollow cylinder defining an internal chamber which is divided into a compression compartment and an expansion compartment by a piston. The piston is slidably positioned in the internal chamber. A closed end of the cylinder is connected to the unsprung mass of the vehicle via a mount, like an eyelet. The piston rod extends through a seal assembly mounted on the other end of the hollow cylinder for movement relative to the cylinder. The piston rod has its inner end connected to the piston for movement therewith and its projecting end terminates in another mount (or eyelet) connectable to the vehicle.

When the piston is moved within the hollow cylinder, valving within the cylinder and piston may permit fluid to flow between the compression and rebound compartments (depending on the direction). The flow of the hydraulic fluid between these two compartments is known as the compression bleed circuit and the rebound bleed circuit, respectively. The damping characteristics of such dual-acting hydraulic dampers are determined by the rate at which fluid is permitted to flow between the compression and rebound compartments through the compression bleed circuit and the rebound bleed circuit. These rates may control the speed at which the piston may move in the cylinder responsive to the external forces applied to the damper.

One problem with known dual-acting hydraulic dampers of this type is the different volumes of the rebound and compression compartments. This may cause the bleed circuits to be unequal. Because the piston rod has to be connected to the piston through the rebound chamber, the piston rod forces the volume of the rebound chamber to be significantly smaller than the volume of the compression chamber. This requires a large collection chamber to accommodate the extra hydraulic fluid pumped from the compression chamber. This large collection chamber requires extra space and materials.

Another problem with a dual-acting shock of this type is the limited adjustments that have been included. Those working in the art have long recognized the desirability of being able to change or adjust the rate of fluid flow so that the damping characteristics of a shock absorber of this type may be changed to accommodate the varying conditions applied to the vehicle. Adjustable damping shock absorbers have been proposed in the past and have included mechanisms for selectively changing the rate of fluid flow. These prior mechanisms share the disadvantages of requiring structurally complex individual components. The complexity is a result of the need to provide adjustment of the primary fluid flow path of the shock absorber, the inaccessibility of the location of the flow adjustment, and the need to provide for adjustment over a wide range of flows. This complexity results in relatively high fabrication and/or assembly costs.

Typically, a dual-acting hydraulic damper of this type may include one or two separate adjustments. For example, the damper may include: an adjustment for high speed compression; two adjustments, one for high speed compression and one for high speed rebound; or two adjustments, one for high speed compression and one for low speed compression. However, no known dual-acting hydraulic damper has been provided with four independent damping adjustments, a first for high speed compression, a second for low speed compression, a third for high speed rebound, and a fourth for low speed rebound.

The instant invention is designed to address the above mentioned problems.

SUMMARY OF THE INVENTION

The instant invention is a linear impelled module damper. The linear impelled module damper includes a hollow cylinder having an inner body, an outer body, and a channel between the inner and outer body. The hollow cylinder has a sealed first end and a sealed second end. A piston movable within the hollow cylinder divides the hollow cylinder into a compression chamber and a rebound chamber. The channel communicates with the rebound chamber through at least one hole in the rebound chamber. A compression extension cylinder is rigidly fixed to the hollow cylinder approximate to the sealed second end on one end, and having a compression mount attached to the other end. The compression extension cylinder including an air valve being adapted to allow a piston rod to move in and out of the compression extension cylinder. The piston rod including a rebound mount on one end and extending into the compression extension cylinder on the other.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 10 shows a side view of the removable adjustment module shown in FIG. 9.

FIG. 11 shows another side view of the removable adjustment module shown in FIG. 9.

FIG. 12 shows another side view of the removable adjustment module shown in FIG. 9.

FIG. 13 shows a top view of the removable adjustment module shown in FIG. 9.

DETAILED DESCRIPTION OF THE INVENTION

Figure 1:
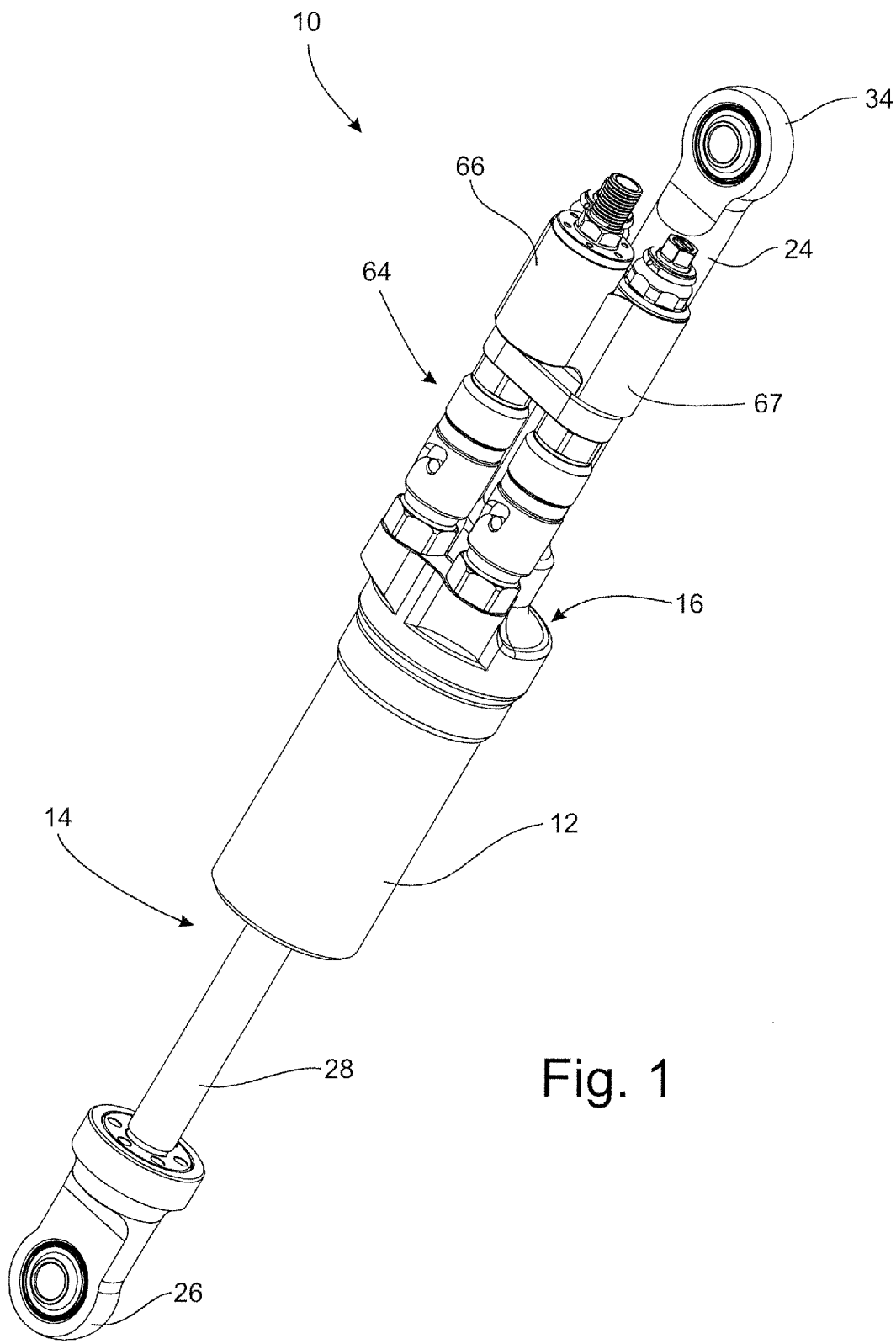
FIG. 1 shows a perspective view of one embodiment of the linear impelled module damper according to the instant invention.
Figure 2:
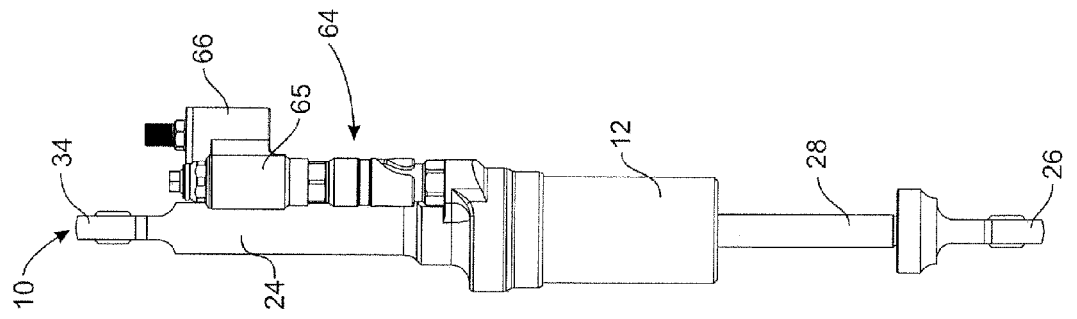
FIG. 2 shows a front view of the embodiment of the linear impelled module damper shown in FIG. 1.
Figure 3:
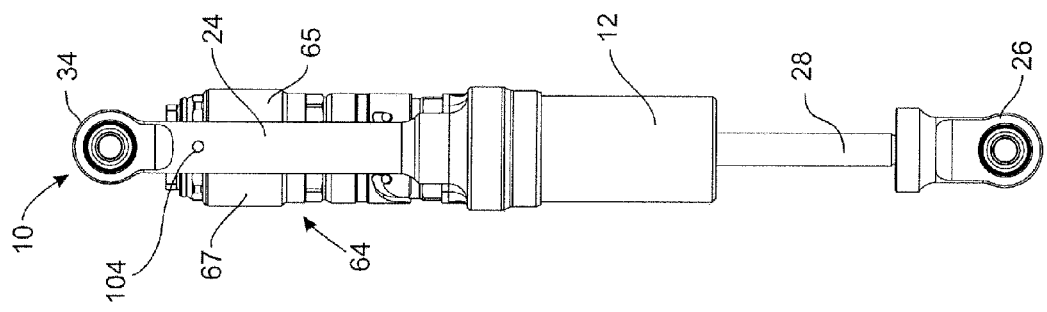
FIG. 3 shows a right side view of the embodiment of the linear impelled module damper shown in FIG. 1.
Figure 4:
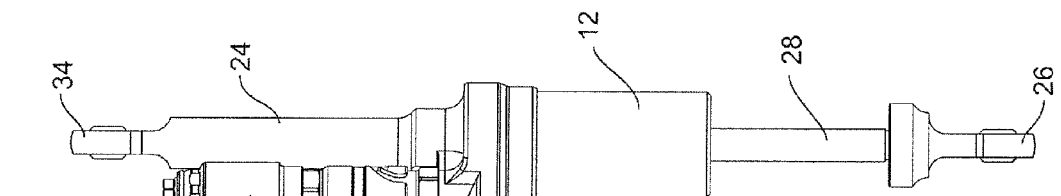
FIG. 4 shows a rear view of the embodiment of the linear impelled module damper shown in FIG. 1.
Figure 5:
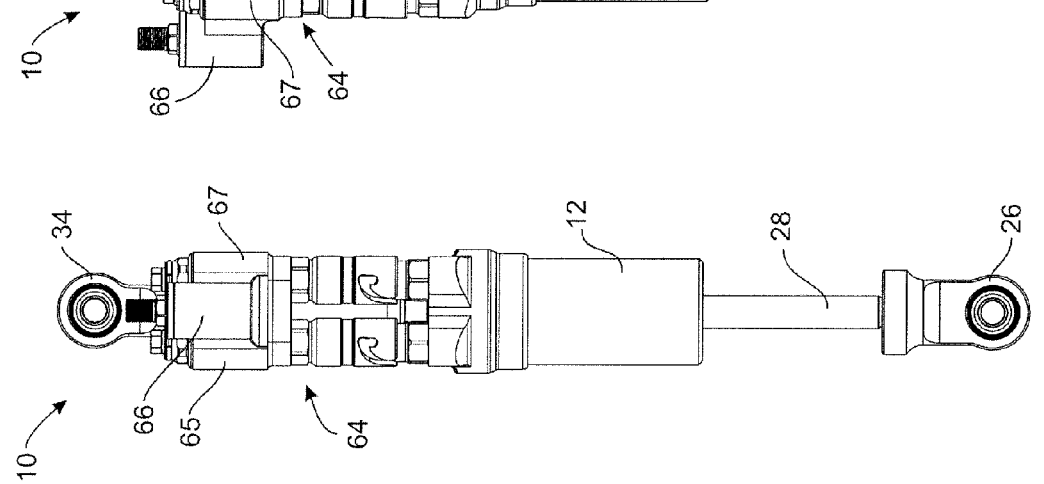
FIG. 5 shows a left side view of the embodiment of the linear impelled module damper shown in FIG. 1.
Figure 6:
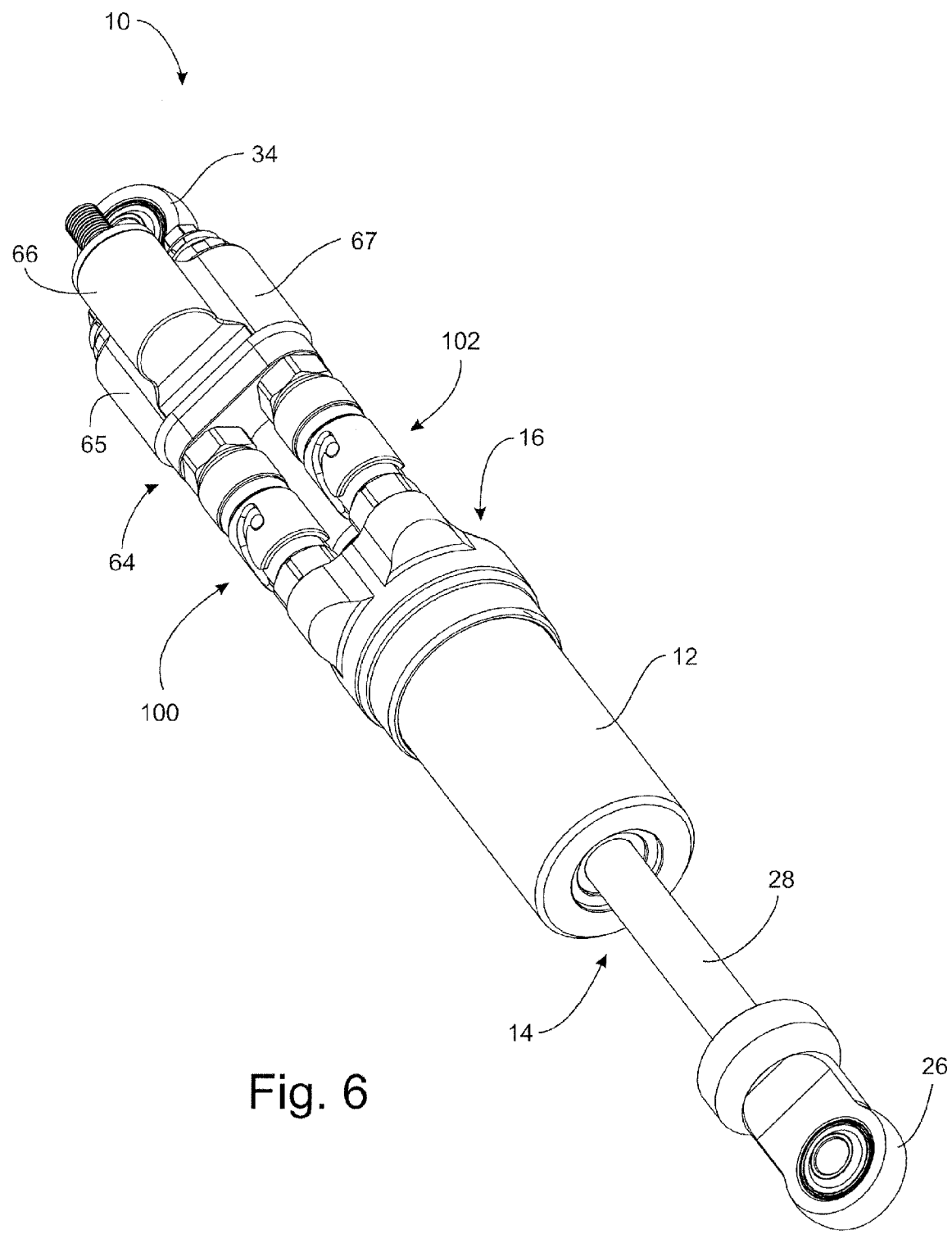
FIG. 6 shows another prospective view of the embodiment of the linear impelled module damper shown in FIG. 1.

Referring to the drawings, wherein like numerals indicate like elements, there is shown in FIGS. 1-8 an embodiment of a linear impelled module damper 10 for a vehicle's suspension. Linear impelled module damper 10, hereinafter damper 10, may be utilized for damping any device, including, but not limited to, a vehicle, like an automobile. The automobile may be any automobile, including, but not limited to a racecar like a stock car racecar, or an open wheeled racecar. Linear impelled module damper 10 may be a dual-acting hydraulic damper. All parts of linear impelled module damper 10 may be made with any tolerances, including, but not limited to, tolerances of ±0.0025 inches. In addition, all diameter concentricity may not exceed 0.002 TIR. Linear impelled module damper 10 may generally include a hollow cylinder 12, a piston 18, a piston rod 28, and a compression extension cylinder 24.

Hollow cylinder 12 may be included in linear impelled module damper 10. See FIGS. 1-8. Hollow cylinder 12 may be for providing a housing for piston 18. Hollow cylinder 12 may be any housing capable of housing piston 18. Hollow cylinder 12 may be any type or shape housing for piston 18. Hollow cylinder 12 may be made of any material. Hollow cylinder 12 may include a sealed first end 14 and a sealed second end 16. Hollow cylinder 12 may also include an inner body 12a, an outer body 12b and a channel 84 in between inner body 12a and outer body 12b.

Inner body 12a may be included in hollow cylinder 12. See FIGS. 7-8. Inner body 12a may be the inner cylinder of hollow cylinder 12. Inner body 12a may be for providing a surface from piston 18 to be sealed against as it moves within hollow cylinder 12. Inner body 12a may be made out of any material. In one embodiment, the inner body 12a of hollow cylinder 12 may be made from Nanotechnology tubing. By making inner body 12a with Nanotechnology tubing, inner body 12a may remove certain carbon elements from steel, leaving a very hard and strong material. This makes it desirable to achieve a highly polished surface finish by honing the tube. In another embodiment, inner body 12a may be made from an aluminum body. Inner body 12a may have any wall thickness. In one embodiment, inner body 12a may be a wall thickness of 0.030-0.040 inches. Inner body 12a may include any finish. In one embodiment, inner body 12a may include a burnished finish, a hard anodized finish, and/or a honed finish.

Inner body 12a may allow piston rod 28 to move through it on both of its ends. Inner body 12a may be sealed on both ends to piston rod 28. Inner body 12a may contain piston 18, compression chamber 20 and rebound chamber 22. Piston 18 may divide inner body 12a into compression chamber 20 and rebound chamber 22.

In the rebound chamber of inner body 12a, inner body 12a may include a hole 82 at the bottom of rebound chamber 22 for communicating with the rebound bleed circuit. See FIG. 7. Hole 82 may be any hole, channel, conduit, etc, through the bottom of rebound chamber 22 of inner body 12a. Hole 82 may be a single hole, channel, conduit, etc, or any number thereof. Holes 82 may communicate with channel 84 between inner body 12a and outer body 12b. This may allow fluid displaced from rebound chamber 22 to move through plurality of holes 82, into channel 84 and up into rebound adjustment module tube 67 of removable adjustment module 64. This flow is considered as the rebound bleed circuit.

In the compression chamber of inner body 12a, inner body 12a may include a direct connection 85 between compression chamber 20 and compression adjustment module tube 65 of removable adjustment module 64. See FIG. 7. Direct connection 85 may be any channel, conduit, etc. communicating from compression chamber 20 to compression adjustment module tube 65. This flow is considered as the compression bleed circuit.

Outer body 12b may be included in hollow cylinder 12. See FIGS. 7-8. Outer body 12b may be the outer cylinder of hollow cylinder 12. Outer body 12b may be for providing the outer structure to hollow cylinder 12. Outer cylinder 12b may also be for providing channel 84 around inner cylinder 12a. Outer body 12b, similar to inner body 12a, may allow piston rod 28 to move through it on both of its ends. Outer body 12b may be sealed on both ends to piston rod 28. Outer body 12b may be made out of any material. In one embodiment, outer body 12b may be machined from 7075-T6 or 7086 aluminum, depending on specific heat applications. Outer body 12b may include any finish. In one embodiment, outer body 12b may include a Chromic Anodized finish, which may be ideal for stress related applications. In another embodiment, outer body 12b may include a Hard Anodized finish. Outer body 12b may be finished as per military specification Mil-A-8625 with a surface buildup of 0.0035 and a penetration into the substrate of 0.00035. Outer body 12b may include a smooth surface. Outer body 12b may include any wall thickness. In one embodiment, outer body 12b may include a wall thickness of 0.065 to 0.075 inches. In another embodiment, where a carbon fiber wrapping is provided on outer body 12b for added radial and burst strength, outer body 12b may include a wall thickness much less than 0.065 inches.

Sealed first end 14 may be included in hollow cylinder 12. See FIGS. 1 and 6-8. Sealed first end 14 may be for sealing one end of hollow cylinder 12. Sealed first end 14 may seal both inner body 12a and outer body 12b of hollow cylinder 12. Sealed first end 14 may also be for allowing piston rod 28 to slide through it while still sealing hollow cylinder 12. Sealed first end 14 may be any seal capable of sealing hollow cylinder 12 and allowing piston rod 28 to slide through it. Sealed first end 14 may be made of any material. In one embodiment, sealed first end 14 may include a polytetrafluoroethylene (PTFE) material. The PTFE material may be any PTFE material, including a polymer energized PTFE material or a spring energized PTFE material. The selection of the PTFE material depends on the vibration frequency of the linear impelled module damper 10. Sealed first end 14 may include first shaft bearings 15.

First shaft bearings 15 may be included in sealed first end 14. See FIG. 8A. First shaft bearings 15 may be for constraining the movement of piston rod 28 within cylindrical housing 12. First shaft bearings 15 may be any bearings capable of constraining the movement of piston rod 28 within cylindrical housing 12. First shaft bearings 15 may be made on any material. In one embodiment, first shaft bearings 15 may be made from a Dupont composite polyimide. In this embodiment, the grade of this material may be determined by volume weight and strength. The inner running coulomb surface of first shaft bearings 15 may made of any material, like, being an aluminum insert coated with a PTFE material. First shaft bearings 15 may allow for any degree of misalignments with external mounts. In one embodiment, first shaft bearings 15 may allow for a 1 degree of misalignments with external mounts.

Sealed second end 16 may be included in hollow cylinder 12. See FIGS. 1 and 6-8. Sealed second end 16 may be for sealing the other end of hollow cylinder 12 (opposite sealed first end 14). Sealed second end 16 may also be for allowing piston rod 28 to slide through it while still sealing hollow cylinder 12. Sealed second end 16 may be any seal capable of sealing hollow cylinder 12 and allowing piston rod 28 to slide through it. Sealed second end 16 may be made of any material. In one embodiment, sealed second end 16 may include a polytetrafluoroethylene (PTFE) material. The PTFE material may be any PTFE material, including a polymer energized PTFE material or a spring energized PTFE material. The selection of the PTFE material depends on the vibration frequency of the linear impelled module damper 10. Sealed second end 16 may include second shaft bearings 17.

Second shaft bearings 17 may be included in sealed second end 16. See FIG. 8A. Second shaft bearings 17 may be for constraining the movement of piston rod 28 within cylindrical housing 12. Second shaft bearings 17 may be any bearings capable of constraining the movement of piston rod 28 within cylindrical housing 12. Second shaft bearings 17 may be made on any material. In one embodiment, second shaft bearings 17 may be made from a Dupont composite polyimide. In this embodiment, the grade of this material may be determined by volume weight and strength. The inner running coulomb surface of second shaft bearings 17 may made of any material, like, being an aluminum insert coated with a PTFE material. Second shaft bearings 17 may allow for any degree of misalignments with external mounts. In one embodiment, second shaft bearings 17 may allow for a 1 degree of misalignments with external mounts.

Piston 18 may be included in linear impelled module damper 10. See FIGS. 7-8. Piston 18 may be movable within hollow cylinder 12. Piston 18 may divide hollow cylinder 12 into a compression chamber 20 and a rebound chamber 22. Piston 18 may be for transferring external forces applied to damper 10 to either compression chamber 20 or rebound chamber 22 (depending on which direction the external force is applied). Piston 18 may be any size or shape of piston. Piston 18 may be sealed to inner body 12a of hollow cylinder 12. Piston 18 may be sealed to inner body 12a by any means, including, but not limited to, piston rings or seals. In one embodiment, piston 18 may be sealed to inner body 12a by opposing single edge low friction PTFE seals. Piston 18 may be rigidly fixed to piston rod 28 within hollow cylinder 12. Piston 18 may be made out of any material. In one embodiment, piston 18 may be machined from 6Al-4V titanium. This titanium may allow for stiffness at a low weight. In one embodiment, piston 18 may be U-shaped. This U-shape may allow for material removal and consequently weight reduction. Piston 18 may include any tolerances. Tolerances may be dependant on manufacturer's friction test results. Piston 18 may include any finish. In one embodiment, piston 18 may be finished with TiN coating.

Compression chamber 20 may be included in hollow cylinder 12. See FIGS. 8A-8B. Compression chamber 20 may be for providing a chamber on the compression side of piston 18 for housing fluid. Compression chamber 20 may be any size or shape. Compression chamber 20 may be within inner body 12a and sealed on one end by sealed second end 16 and sealed on the other end by piston 18. Compression chamber 20 may include direct connection 85 between compression chamber 20 and compression adjustment module tube 65 of removable adjustment module 64. See FIG. 7. This flow is considered as the compression bleed circuit.

Rebound chamber 22 may be included in hollow cylinder 12. See FIGS. 8B-8C. Rebound chamber 22 may be for providing a chamber on the rebound side of piston 18 for housing fluid. Rebound chamber 22 may be any size or shape. Rebound chamber 22 may be within inner body 12a and sealed on one end by sealed first end 14 and sealed on the other end by piston 18. Rebound chamber 22 may include a plurality of holes 82 at its bottom for communicating with the rebound bleed circuit. See FIG. 7. Holes 82 may communicate with channel 84 between inner body 12a and outer body 12b. This may allow fluid displaced from rebound chamber 22 to move through holes 82, into channel 84 and up into rebound adjustment module tube 67 of removable adjustment module 64. This flow is considered as the rebound bleed circuit.

Compression extension cylinder 24 may be included in linear impelled module damper 10. See FIGS. 1-8. Compression extension cylinder 24 may be for providing a structure for piston rod 18 to extend into within linear impelled module damper 10 when the damper is compressed. By providing a space for piston rod 18 to extend into, compression extension cylinder 24 may allow for the volumes of compression chamber 20 and rebound 22 to be approximately equal. Compression extension cylinder 24 may include an air valve 104. Air valve 104 may allow piston rod 18 to move freely in compression extension cylinder 24 by regulating the air in compression cylinder 24. Air valve 104 may allow air to exit cylinder 24 when piston rod 18 moves into cylinder 24 and may allow air to enter cylinder 24 when piston rod 18 moves out of cylinder 24. Air valve 104 may be a valve, hole, chamber, or plurality of such for regulating the pressure in cylinder 24. Compression extension cylinder 24 may be any size or shape structure adapted to receive piston rod 18 when damper 10 may be compressed. Compression extension cylinder 24 may be rigidly fixed to hollow cylinder 12. In one embodiment, compression extension cylinder 24 may be rigidly fixed to hollow cylinder 12 approximate to sealed second end 16. Compression extension cylinder 24 may have a rebound mount 34 affixed to its end. Rebound mount 34 may be any mount for allowing damper 10 to be attached to the device to be dampened, like, a vehicle. For example, when damper 10 may be utilized in a race car, rebound mount 34 may be an eyelet for attachment to the race cars wheels or suspension.

Figure 7:
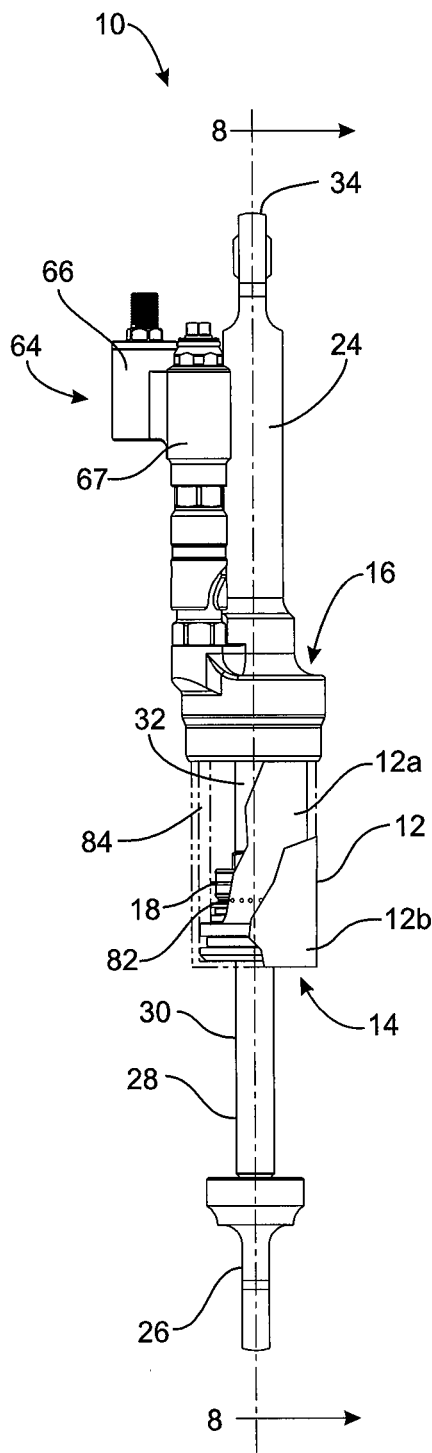
FIG. 7 shows a partially cut away side view of the linear impelled module damper shown in FIG. 1.
Figure 8A:
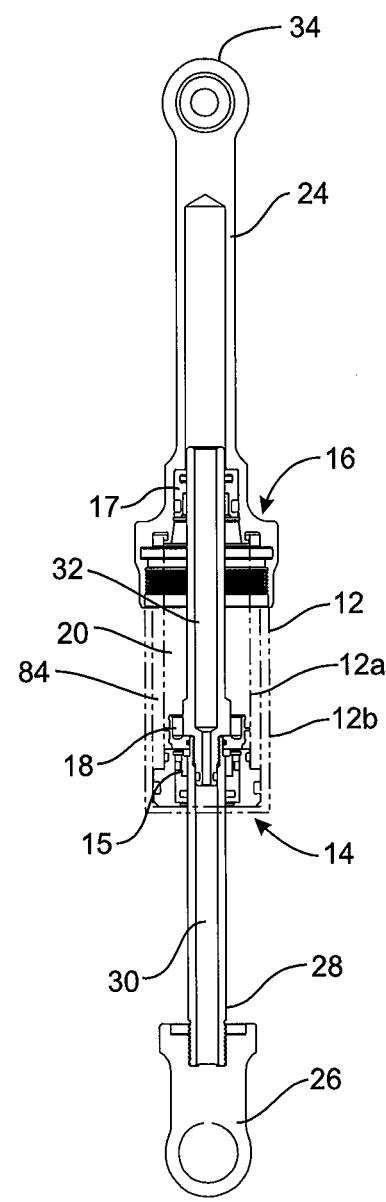
FIG. 8A shows a cross-sectional view of the linear impelled module damper of FIG. 1 shown in an rebound.
Figure 8B:
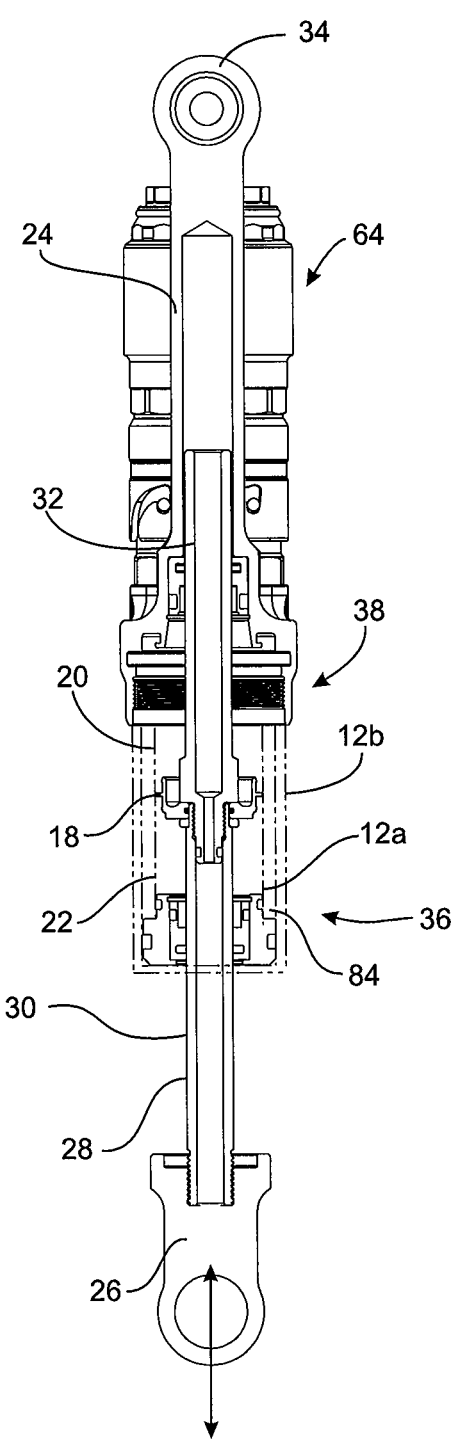
FIG. 8B shows a cross-sectional view of the linear impelled module damper of FIG. 1 shown in a neutral state.
Figure 8C:
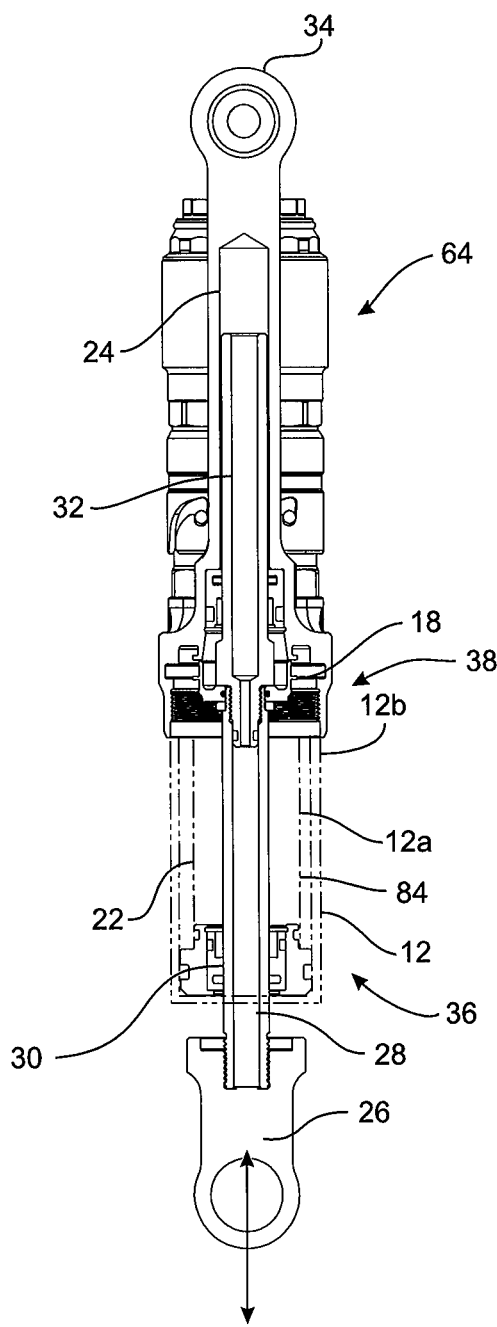
FIG. 8C shows a cross-sectional view of the linear impelled module damper of FIG. 1 shown in compression.
Figure 9:
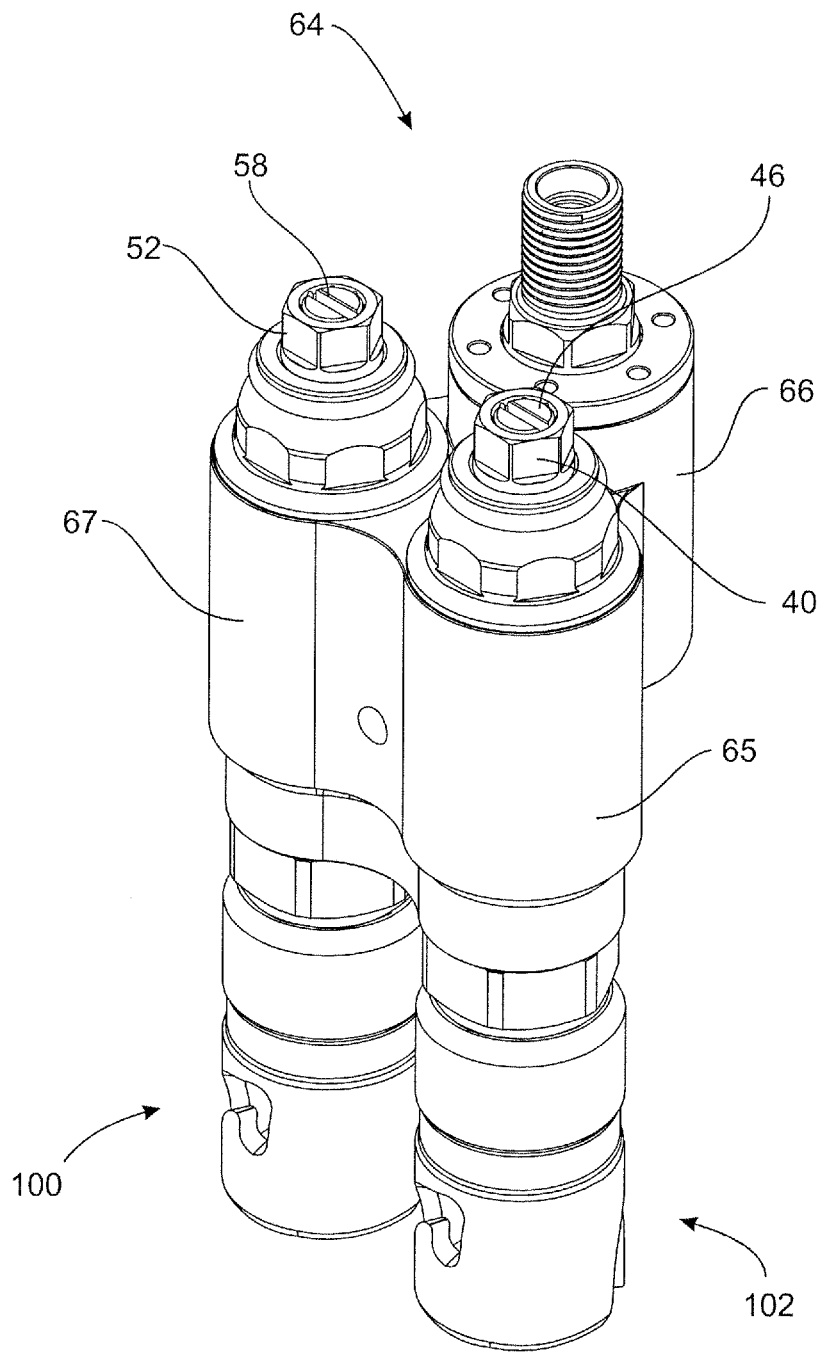
FIG. 9 shows a prospective view of one embodiment of the removable adjustment module according to the instant invention.
Figure 14:
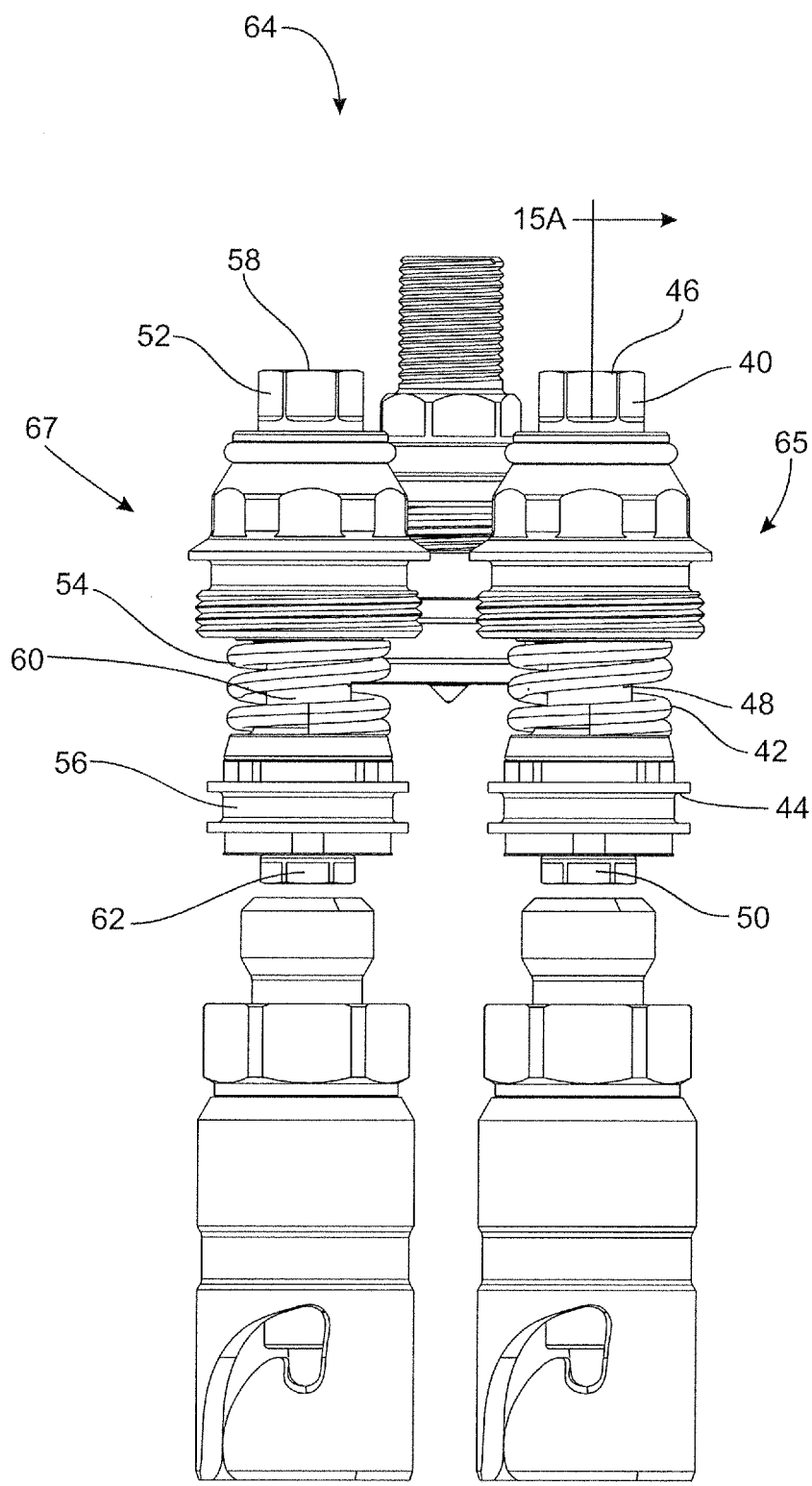
FIG. 14 shows a partially exposed view of the removable adjustment module FIG. 9.

Piston rod 28 may be included in linear impelled module damper 10. See FIGS. 1-8. Piston rod 28 may be for connecting piston 18 with the external forces applied to linear damper 10. Piston rod 28 may be any device for connecting piston 18 with the external forces applied to linear damper 10. Piston rod 28 may be movable through sealed first end 14 and sealed second end 16 of hollow cylinder 12. Piston rod 28 may include a compression mount 26 on one end. Piston rod 28 may extend into compression extension cylinder 24 on the other end (opposite of compression mount 26). Piston rod 28 may be rigidly fixed to piston 18 within hollow cylinder 12. Piston rod 28 may be any size. In one embodiment, piston rod 28 may have a diameter of 0.500 inches. For example, piston rod 28 may have a diameter of 0.5000 inches for open wheel cars that require lower frictional diametric area. Piston rod 28 may be solider or hollow. In one embodiment, piston rod 28 may be hollow and fitted with a Lee Plug. Piston rod 28 may be made out of any material, including, but not limited to aluminum, titanium, steel alloy, or a composite. The aluminum may be any aluminum, including, but not limited to, 6061-T6 aluminum, 7075-T6 aluminum, 7086 aluminum. The titanium may me any titanium, including, but not limited to, 6AL-4V titanium. The composite may be any composite, including, but not limited to, a titanium skeletal spine sub frame with a high carbon content composite Polyimide cylinder shroud ground and polished. Piston rod 28 may include any finish, including, but not limited to, an RC70 ceramic surface polish to a 1-2 RMS finish, an RC70 hard chrome polished to a 1-2 RMS finish. Piston rod 28 may have any thickness, including, but not limited to, a wall thickness of 0.062 inches. The wall thickness may be adjusted to allow for weight reduction. Piston rod 28 may be straight and concentric to within a tolerance of 0.001 TIR. In one embodiment, piston rod 28 may be a single rod running through piston 18. In other embodiments, piston rod 28 may include two or more piston rods. As shown in FIGS. 7-8, piston rod 28 may include a first piston rod 30 and a second piston rod 32.

First piston rod 30 may be included as part of piston rod 28. See FIGS. 7-8. First piston rod 30 may be for connecting piston 18 with the external forces applied to linear damper 10. First piston rod 30 may be movable through sealed first end 14. First piston rod 30 may extend from outside hollow cylinder 12, through sealed first end 14, and into compression chamber 20. First piston rod 30 may be rigidly connected to piston 18 inside hollow cylinder 12 at one end. On the other end, first piston rod 30 may terminate with compression mount 26. First piston rod 30 may be any size rod. For example, first piston rod 30 may have a diameter of 0.500 inches for lower frictional diametric area. First piston rod 30 may be solid or hollow. In embodiments where first piston rod 30 may be hollow, a Lee Plug may be included. First piston rod 30 may be made of any material and may include any finish, as discussed above for piston rod 28. In one embodiment, first piston rod 30 may be made of a 6AL-4V titanium with inlaid RC70 hard chrome and polished to a 1-2 RMS finish. This embodiment of material and finish may allow for suspensions that have a lower tension application typical of a torsion bar suspension. However, the invention is not so limited. For example, for a coilover suspension (see FIG. 16), first piston rod 30 may require a material like a steel alloy. First piston rod 30 may have any wall thickness, including, but not limited to, a wall thickness of 0.062 inches. First piston rod 30 may be attached to compression mount 26 by any means. In one embodiment, first piston rod 30 may be attached to compression mount 26 by being fitted with a 6AL-4V Titanium end with an eyelet and clevis. In this embodiment, the titanium end may be electron beam welded and ground for a seamless transition. Compression mount 26 may be any mount for allowing damper 10 to be attached to the device to be dampened, like, a vehicle. For example, when damper 10 may be utilized in a race car, rebound mount 34 may be an eyelet for attachment to the race cars chassis.

Second piston rod 32 may be included as part of piston rod 28. See FIGS. 7-8. Second piston rod 32 may be for maintaining equal volumes within compression chamber 20 and rebound chamber 22. Second piston rod 32 may be movable through sealed second end 16. Second piston rod 32 may extend from piston 18, through compression chamber 20, through sealed second end 14, and into compression extension cylinder 24. Second piston rod 32 may be rigidly connected to piston 18 inside hollow cylinder 12 at one end. On the other end, second piston rod 32 may be movable inside compression extension cylinder 24. Second piston rod 32 may be any size rod. For example, second piston rod 32 may have a diameter of 0.500 inches for lower frictional diametric area. Second piston rod 32 may be solid or hollow. In embodiments where Second piston rod 32 may be hollow, a Lee Plug may be included. Second piston rod 32 may be made of any material and may include any finish, as discussed above for piston rod 28. In select embodiments, second piston rod 32 may be made of 6061-T6 aluminum, 7075-T6 aluminum, or 7086 aluminum with a Rc70 ceramic surface polished to a 1-2 RMS finish. In another embodiment, second piston rod 32 may be made of a composite material, for example, in low stress applications. This composite material may be designed as a titanium skeletal spine sub frame with a high carbon content composite Polyimide cylinder shroud, ground and polished. However, the invention is not so limited and other materials and finishes may be used.

In one embodiment, first piston rod 30 and second piston rod 32 may have approximately equal diameters. This embodiment may allow the volumes of compression chamber 20 and rebound chamber 22 to be approximately equal.

In another embodiment, first piston rod 30 may have a slightly smaller diameter than second piston rod 32. This embodiment may be required when a piston pressure differential occurs to allow compression chamber 20 to remain equal to rebound chamber 22. The difference between the diameter of first piston rod 30 and the diameter of second piston rod 32 may be dependent of the amount of piston pressure differential and the materials used in first piston rod 30 and second piston rod 32.

A compression bleed circuit 36 may be included in linear impelled module damper 10. See FIGS. 8A-8C. Compression bleed circuit 36 may be adapted to control the hydraulic fluid displaced from compression chamber 20. Compression bleed circuit 36 may include any valving required to control the hydraulic fluid displaced from compression chamber 20. In one embodiment, compression bleed circuit 36 may include the flow from compression chamber 20 through direct feed 85 and into compression adjustment module tube 65 of removable adjustment module 64.

A rebound bleed circuit 38 may be included in linear impelled module damper 10. See FIGS. 8A-8C. Rebound bleed circuit 38 may be for controlling the hydraulic fluid displaced from rebound chamber 22. Rebound bleed circuit 38 may include any valving required to control the hydraulic fluid displaced from rebound chamber 22. In one embodiment, rebound bleed circuit may include the flow from rebound chamber 22 through holes 82, into channel 84 between inner body 12*a* and outer body 12*b* and into rebound adjustment module tube 67 of removable adjustment module 64.

A removable adjustment module 64 may be included with linear impelled module damper 10. See FIGS. 1-7, 9-14 and 16-19. Removable adjustment module 64 may be for housing the adjustments of damper 10. Removable adjustment module 10 may be a removable quick disconnect dry breack (manifold module). Removable adjustment module 64 may include housing for, but not limited to, first adjustment 40, second adjustment 46, third adjustment 52, fourth adjustment 58, and/or any combinations thereof. In one embodiment, removable adjustment module 64 may house first adjustment 40 and second adjustment 46 in one cylinder, compression adjustment module tube 65. In another embodiment, removable adjustment module 64 may house third adjustment 52 and fourth adjustment 58 in another cylinder, rebound adjustment module tube 67. Removable adjustment module 64 may include an expansion chamber 66. In one embodiment, expansion chamber 66 may be positioned between and communicate with compression adjustment module tube 65 and rebound adjustment module tube 67. This may allow for the fluid to flow between compression bleed circuit 36 and rebound bleed circuit 38. Removable adjustment module 64 may communicate with hollow cylinder 12 by any means. In one embodiment, removable adjustment module 64 may communicate with hollow cylinder 12 by two connections, a compression connection 100 for compression adjustment module 65, and a rebound connection 102 for rebound adjustment module tube 67. This communication may be done by any connections, including, but not limited to, removable quick disconnect dry break connections. Removable adjustment module 64 may communicate with compression bleed circuit 36 and rebound bleed circuit 38 of hollow cylinder 12. The manifold of removable adjustment module 64 may be made of any material. In one embodiment, the manifold of removable adjustment module 64 may be machined from billet aluminum. The billet aluminum of this embodiment may be any billet aluminum, including, but not limited to, 7075-T6 or 7086. The type of aluminum used may depend on the application of damper 10 and how much heat the application produces. Removable adjustment module 64 may include any finish, including, but not limited to, a chromic anodize finish, or a hard anodize finish. The type of finish may also depend on the application of damper 10 and how much heat the application produces.

Figure 15A:
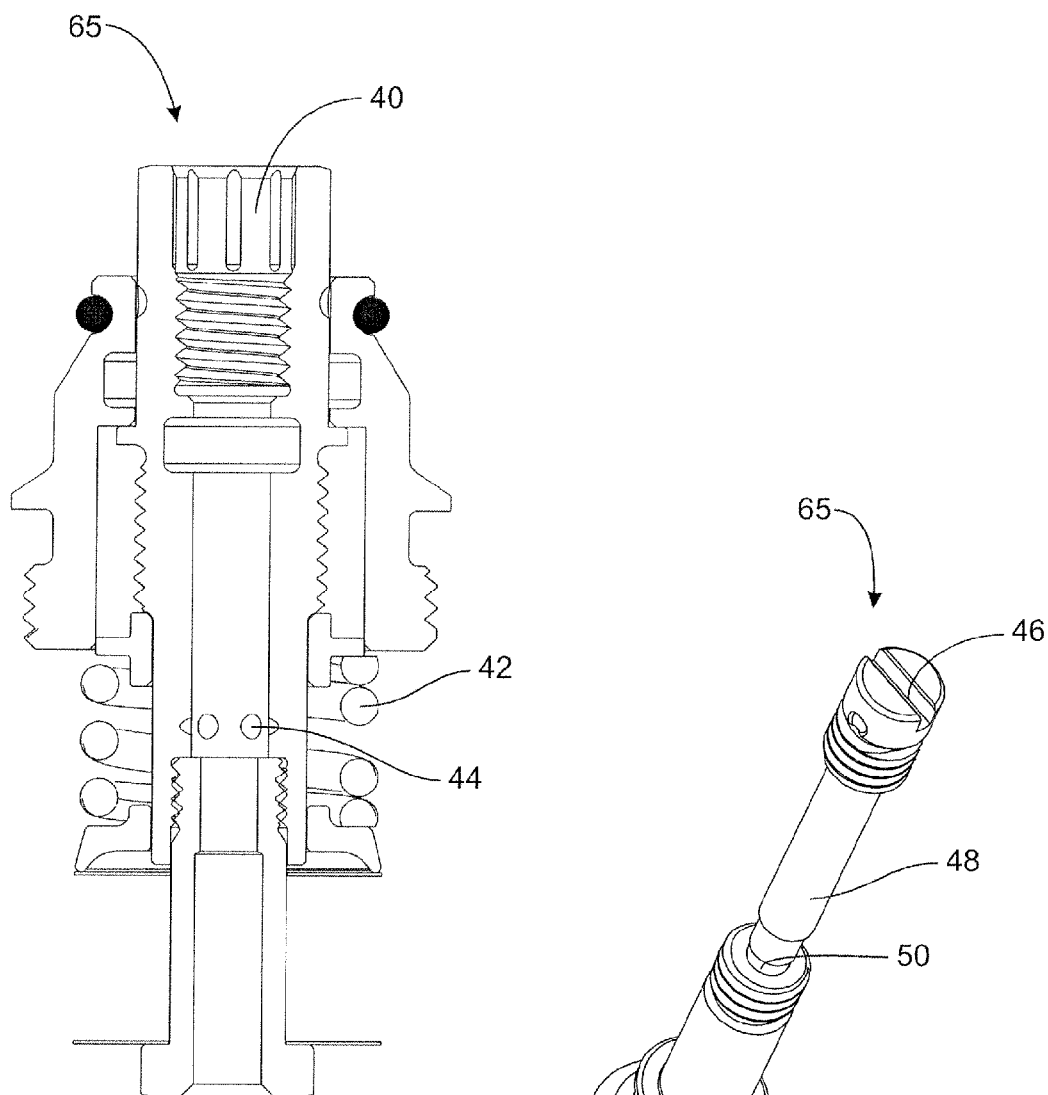
FIG. 15A shows a cross-sectional view of a compression adjustment module tube or rebound adjustment module tube from the removable adjustment module shown in FIG. 9.
Figure 15B:
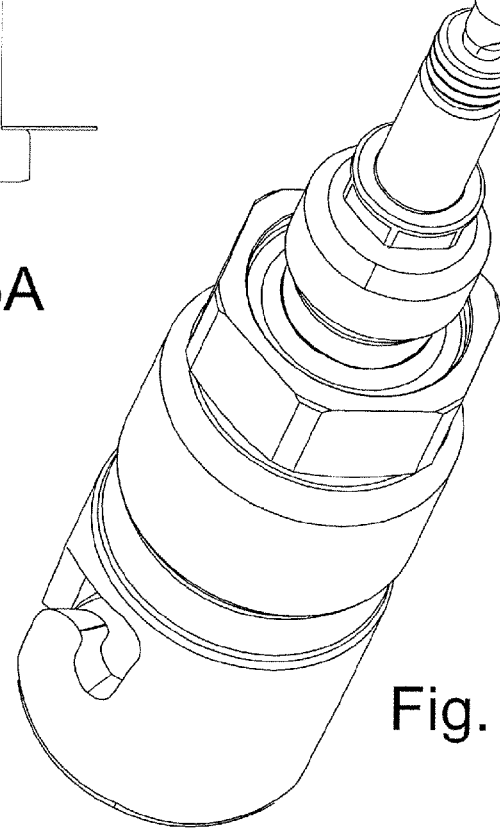
FIG. 15B shows a partially exposed perspective view of a compression tapered needle or a rebound tapered needle from the removable adjustment module shown in FIG. 9.

A first adjustment 40 may be included in linear impelled module damper 10. See FIGS. 9-11 and 13-15. First adjustment 40 may be for adjusting high speed flow through compression bleed circuit 36. See FIG. 19. First adjustment 40 may be any device capable of adjusting high speed flow through compression bleed circuit 36. In one embodiment, first adjustment 40 may include a compression spring 42. Compression spring 42 may communicate with a first opening 44 in compression bleed circuit 36. Compression spring 42 may be compressed or lengthened to control the amount of force required to raise and lower compression spring 42 in first opening 44. This may be done by turning a threaded nut mounted over compression spring 42. First adjustment 40 may be configured to adjust in a clockwise direction with equally spaced apart clicks for determining the amount of adjustment. In addition, an electronic manifold module 98 may be included for active damping (see FIG. 18). In one embodiment, compression spring 42 may be a simple coil spring (see FIGS. 14-15) where tightening and loosening of the spring results in a linear adjustment of the high speed flow through the compression bleed circuit. In another embodiment, compression spring 42 may be a radial spring or circular disk spring, where tightening and loosening of the spring results in an incremental adjustment of the high speed flow through the compression bleed circuit. This embodiment may allow for fine tuning of the high speed flow through the compression bleed circuit by providing a progressive adjustment rate. This radial spring embodiment, not shown in the Figures, may require a shim or carrier to be included for positioning of the radial spring. First adjustment 40 may be made of any material, including, but not limited to, composites and dissimilar materials, including titanium shims or coils for a higher frequency response. First adjustment 40 may be housed in removable adjustment module 64. In one embodiment, first adjustment 40 may be included in compression adjustment module tube 65.

A second adjustment 46 may be included in linear impelled module damper 10. See FIGS. 9-11 and 13-15. Second adjustment 46 may be for adjusting low speed flow through compression bleed circuit 36. See FIG. 20. Second adjustment 46 may be any device capable of adjusting low speed flow through compression bleed circuit 36. In one embodiment, second adjustment 46 may include a compression tapered needle 48. Compression tapered needle 48 may communicate with a second opening 50 in compression bleed circuit 36. Compression tapered needle 48 may vary the size of second opening 50 by moving in or out of second opening 50. Compression tapered needle 48 may be threaded, thereby allowing it to move in or out of second opening 50 by being turned. Second adjustment 46 may be configured to adjust in a clockwise direction with equally spaced apart clicks for determining the amount of adjustment. In addition, an electronic manifold module 98 may be included for active damping (see FIG. 18). Second adjustment 46 may be made of any material, including, but not limited to, composites and dissimilar materials, including titanium shims or coils for a higher frequency response. Second adjustment 46 may be housed in removable adjustment module 64. In one embodiment, second adjustment 56 may be included in compression adjustment module tube 65.

A third adjustment 52 may be included in linear impelled module damper 10. See FIGS. 9 and 11-15. Third adjustment 52 may be for adjusting high speed flow through rebound bleed circuit 38. See FIG. 21. Third adjustment 52 may be any device capable of adjusting high speed flow through rebound bleed circuit 38. In one embodiment, third adjustment 52 may include a rebound spring 54. Rebound spring 54 may communicate with a third opening 56 in rebound bleed circuit 38. Rebound spring 54 may be compressed or lengthened to control the amount of force required to raise and lower rebound spring 54 in third opening 56. This may be done by turning a threaded cap placed over rebound spring 54. Third adjustment 52 may be configured to adjust in a clockwise direction with equally spaced apart clicks for determining the amount of adjustment. In addition, an electronic manifold module 98 may be included for active damping (see FIG. 18). In one embodiment, rebound spring 54 may be a simple coil spring (see FIGS. 14-15) where tightening and loosening of the spring results in a linear adjustment of the high speed flow through the rebound bleed circuit. In another embodiment, rebound spring 54 may be a radial spring or circular disk spring, where tightening and loosening of the spring results in an incremental adjustment of the high speed flow through the compression bleed circuit. This embodiment may allow for fine tuning of the high speed flow through the rebound bleed circuit by providing a progressive adjustment rate. This radial spring embodiment of rebound spring 54, not shown in the Figures, may require a shim or carrier to be included for positioning of the radial spring. Third adjustment 52 may be made of any material, including, but not limited to, composites and dissimilar materials, including titanium shims or coils for a higher frequency response. Third adjustment 52 may be housed in removable adjustment module 64. In one embodiment, third adjustment 52 may be included in rebound adjustment module tube 67.

A fourth adjustment 58 may be included in linear impelled module damper 10. See FIGS. 9 and 11-15. Fourth adjustment 58 may be for adjusting low speed flow through rebound bleed circuit 38. See FIG. 22. Fourth adjustment 58 may be any device capable of adjusting low speed flow through rebound bleed circuit 38. In one embodiment, fourth adjustment 58 may include a rebound tapered needle 60. Rebound tapered needle 60 may communicate with a fourth opening 62 in rebound bleed circuit 38. Rebound tapered needle 60 may vary the size of fourth opening 62 by moving in or out of fourth opening 62. Rebound tapered needle 60 may be threaded, thereby allowing it to move in or out of fourth opening 62 by being turned. Fourth adjustment 58 may be configured to adjust in a clockwise direction with equally spaced apart clicks for determining the amount of adjustment. In addition, an electronic manifold module 98 may be included for active damping (see FIG. 18). Fourth adjustment 58 may be made of any material, including, but not limited to, composites and dissimilar materials, including titanium shims or coils for a higher frequency response. Fourth adjustment 58 may be housed in removable adjustment module 64. In one embodiment, fourth adjustment 58 may be included in rebound adjustment module tube 67.

Expansion chamber 66 may be included in linear impelled module damper 10. See FIGS. 1-3, 5-7, 9-10, and 12-13. Expansion chamber 66 may communicate hydraulic fluid displaced from compression chamber 20 with rebound chamber 22. Expansion chamber 66 may be any size or shape chamber capable of accommodating hydraulic fluid displaced from both compression chamber 20 and rebound chamber 22. In one embodiment, expansion chamber 66 may be positioned between the chamber for first adjustment 40 and second adjustment 46, and the chamber for third adjustment 52 and fourth adjustment 58. Expansion chamber 66 may include a pilot opening. The pilot opening may be any size opening in expansion chamber 66. In one embodiment, pilot opening may have a diameter as small as 0.001 inches. A diameter this small may reduce the flow path for fluid head expansion. The pilot opening may include a Lee restrictive jet.

Linear Impelled module damper 10 may optionally include a plurality of sensors. The plurality of sensors may be for data acquisition for any properties or performance of damper 10. These sensors may include any type or amount of sensors. In select embodiments, these sensors may include a position sensor. The position sensor may measure the position of piston rod 28 or piston 18 with respect to hollow cylinder 12. This position sensor may be placed anywhere on damper 10. In one embodiment, the position sensor may be a Hall Effect position sensor. In other select embodiments, the plurality of sensors may include a temperature sensor. The temperature sensor may be for measuring the temperature of any location of damper 10. In other select embodiments, the plurality of sensors may include a micro pressure sensor. The micro pressure sensor may be for measuring the pressure within any area of damper 10. In other select embodiments, the plurality of sensors may include a strain gauge sensor. The strain gauge sensor may be for measuring the strain on damper 10. In select embodiments, the plurality of sensors may include a load cell sensor. The load cell sensor may be for measuring the load placed on damper 10.

In operation, linear impelled module damper 10 may be utilized to dampen the forces placed on a device, like a vehicle. For example, damper 10 may be installed on an automobile like a race car. Damper 10 may be installed on any device according to known methods in the art. Once installed, damper 10 may be utilized to dampen both the compression and rebound action of the device, i.e., damper 10 may be considered a dual-acting shock absorber.

When damper 10 may be compressed, hydraulic fluid from compression chamber 20 may be forced through compression bleed circuit 36. This compression stroke forces the hydraulic fluid to flow out of compression chamber 20 and into removable adjustment module 64. Inside removable adjustment module 64 the hydraulic fluid flows into compression adjustment module tube 65. At this point, the hydraulic fluid may enter second opening 50 where second adjustment 46 may be adjusted to regulate the low speed compression resistance of damper 10. Also at this point, the hydraulic fluid may enter first opening 44 where first adjustment 40 may be adjusted to regulate the high speed compression resistance of damper 10. From this point, the hydraulic fluid flows into expansion chamber 66 where it then may flow into rebound bleed circuit 38.

Conversely, when damper 10 may be extended (rebound), hydraulic fluid from rebound chamber 22 may be forced through rebound bleed circuit 38. This rebound stroke forces the hydraulic fluid to flow out of rebound chamber 22 and into removable adjustment module 64 (via plurality of holes 82 and channel 84). Inside removable adjustment module 64 the hydraulic fluid flows into rebound adjustment cylinder 67. At this point, the hydraulic fluid may enter fourth opening 62 where fourth adjustment 58 may be adjusted to regulate the low speed rebound resistance of damper 10. Also at this point, the hydraulic fluid may enter third opening 56 where third adjustment 52 may be adjusted to regulate the high speed rebound resistance of damper 10. From this point, the hydraulic fluid flows into expansion chamber 66 where it then may flow into compression bleed circuit 36.

Figure 16:
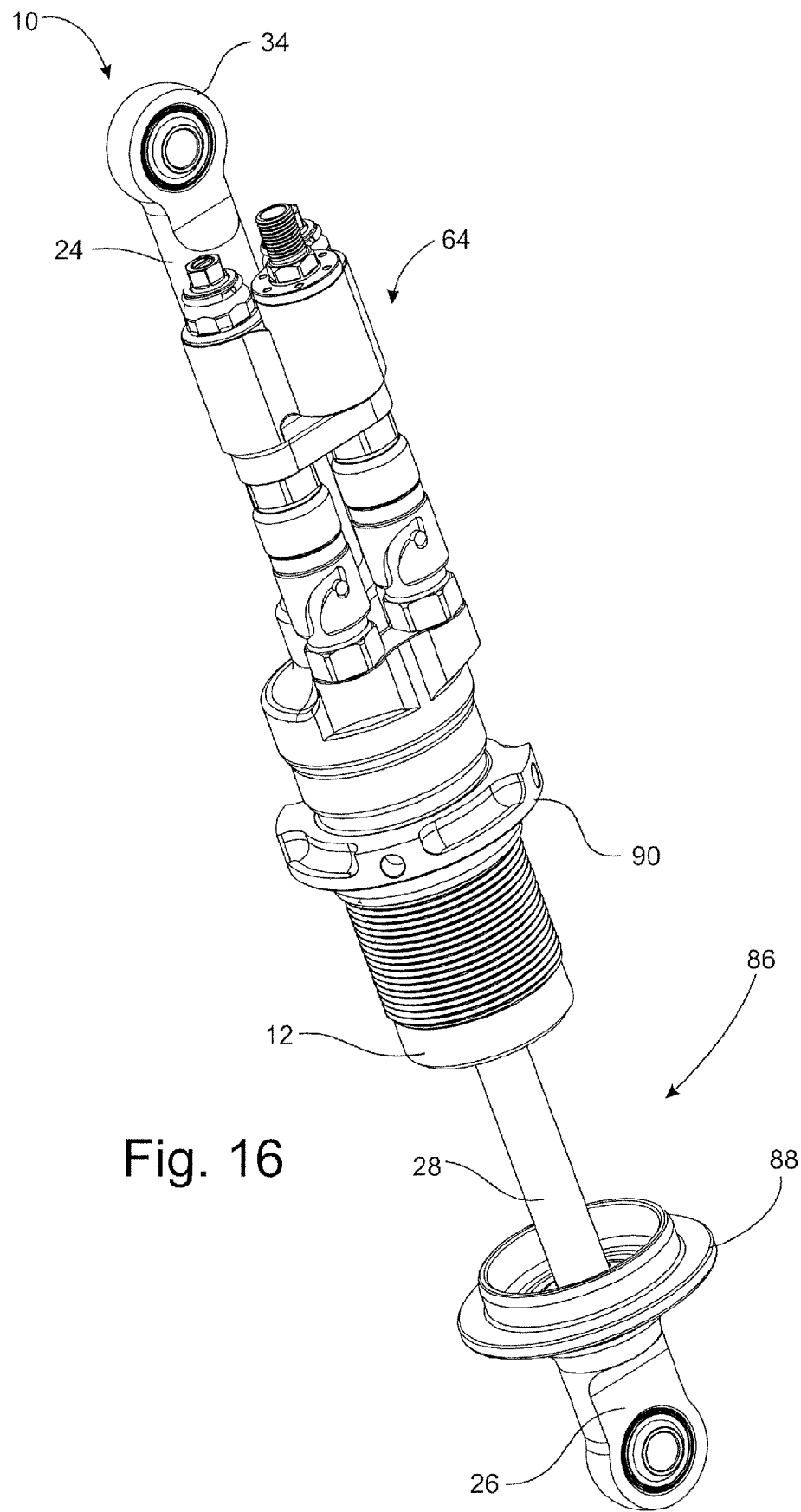
FIG. 16 shows a prospective view of another embodiment of a linear impelled module damper of the instant invention.

Referring to FIG. 16, another embodiment of linear impelled module damper 10 is shown. In this embodiment, damper 10 is configured as a coil over shock. In this embodiment, damper 10 may include a coil over mount 86. Coil over mount 86 may include any parts to mount a coil or spring on the outside or over damper 10. In one embodiment, coil over mount 86 may include a lower coil over mount 88 and an upper coil over mount 90. Lower coil over mount 88 may be attached on piston rod 28 above compression mount 26 and upper coil over mount 90 may be attached on the outside of hollow cylinder 12 approximate to sealed second end 16.

Figure 17:
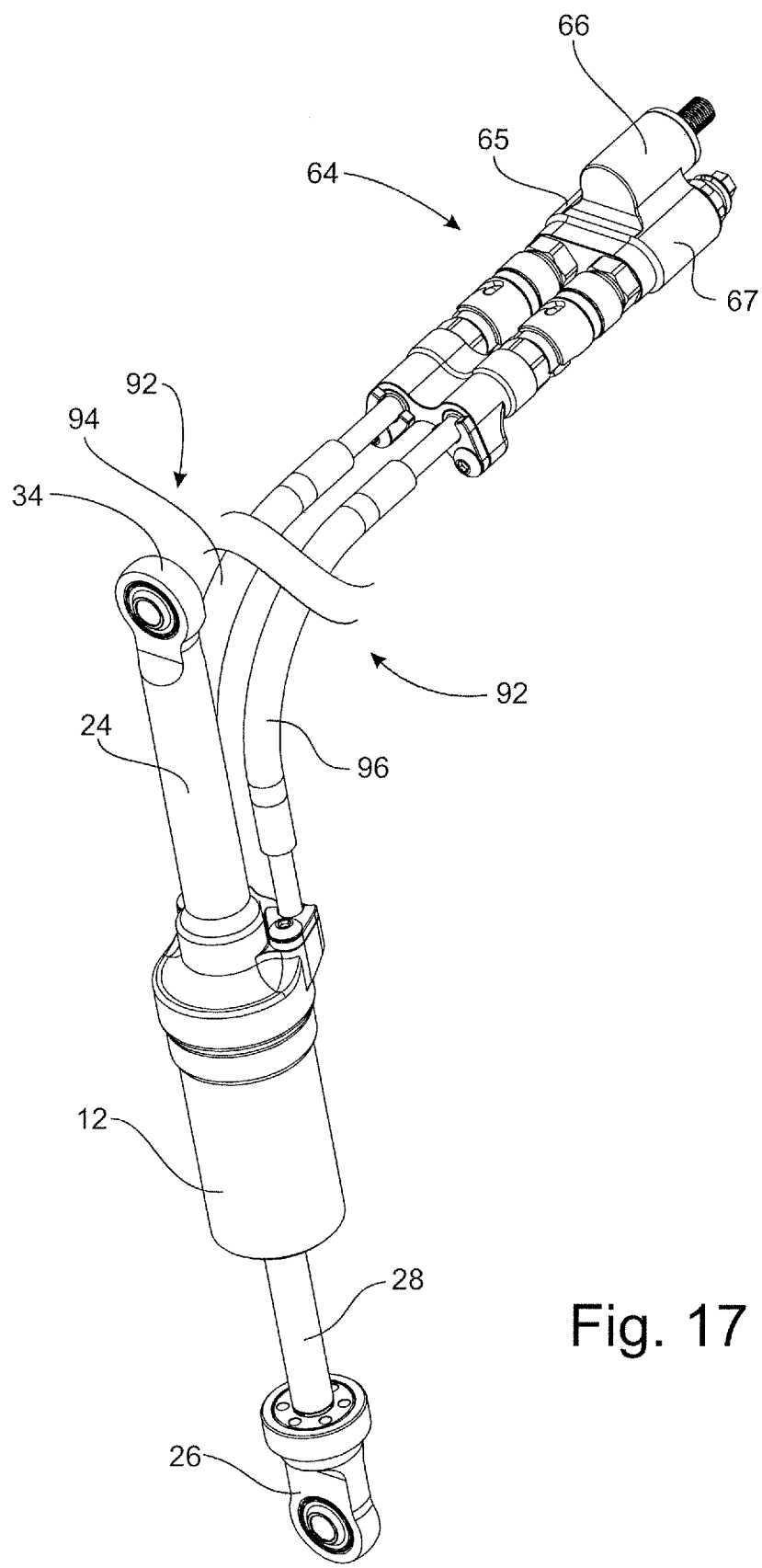
FIG. 17 shows a prospective view of another embodiment of a linear impelled module damper of the instant invention.

Referring to FIG. 17, another embodiment of linear impelled module damper 10 is shown. This embodiment allows for removable adjustment module 64 to be remotely attached to damper 10. In this embodiment remote tubing 92 may be included for allowing removable adjustment module 64 to be remotely attached. Remote tubing 92 may be any length to allow removable adjustment module to be place anywhere. For example, remote tubing 92 may be long enough for removable adjustment module to be mounted inside the car like on the dash board. In one embodiment, remote tubing 92 may include a compression remote tube 94 for connecting compression chamber 20 with compression adjustment module tube 65, and a rebound remote tube 96 for connecting rebound chamber 22 with rebound adjustment module tube 67.

Figure 18:
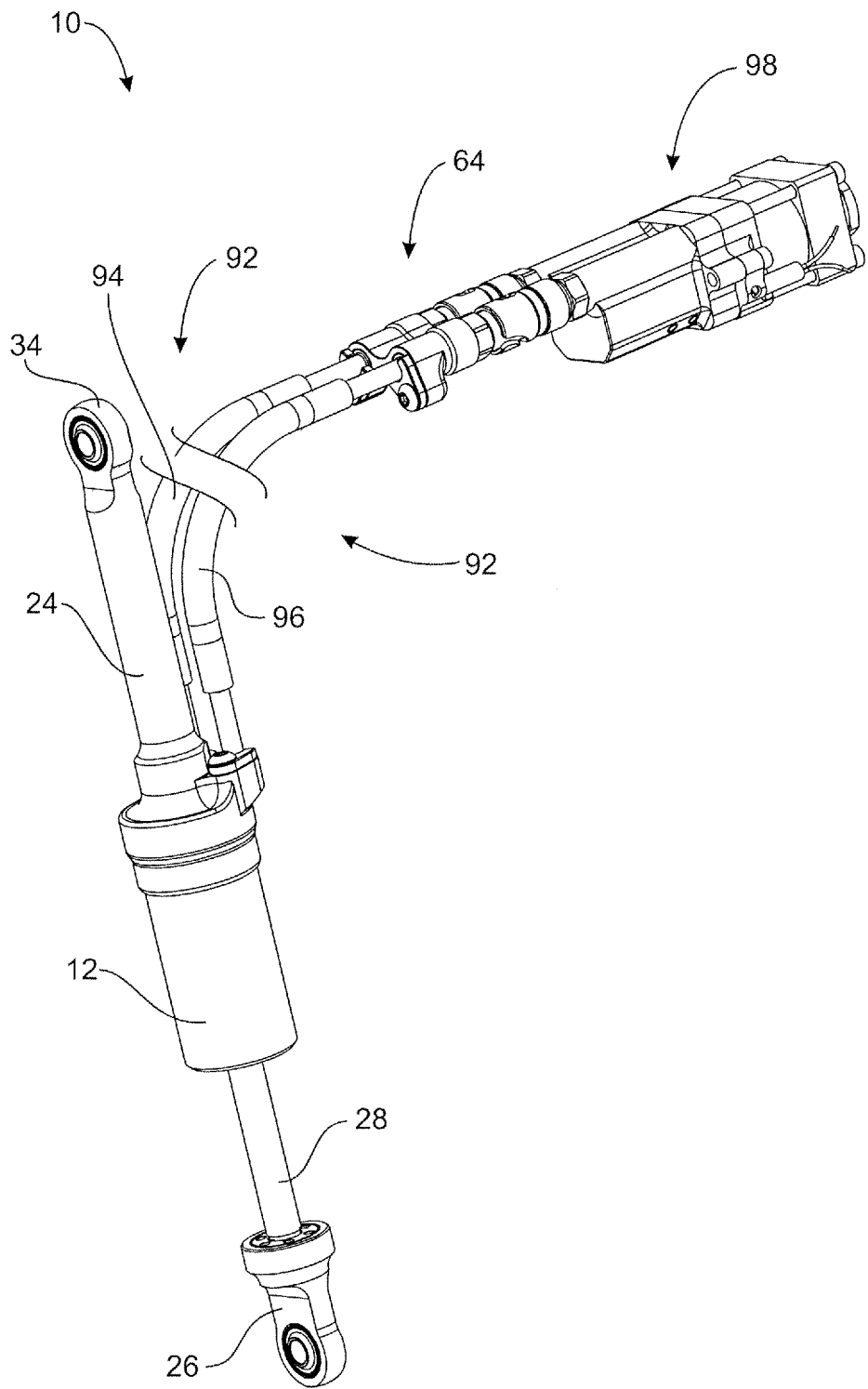
FIG. 18 shows a prospective view of another embodiment of a linear impelled module damper of the instant invention.

Referring to FIG. 18, yet another embodiment of linear impelled module damper 10 is shown. In this embodiment, damper 10 is provided with an electronic manifold module 98 for making damper 10 an active damper. Electronic manifold module 98 may be included on any of the above discussed embodiments of damper 10. Electronic manifold module 98 may actively control any or all of the adjustments on removable adjustment module 64. In one embodiment, electronic manifold module 98 may actively control first adjustment 40, second adjustment 46, third adjustment 52, and fourth adjustment 58.

Figure 19:
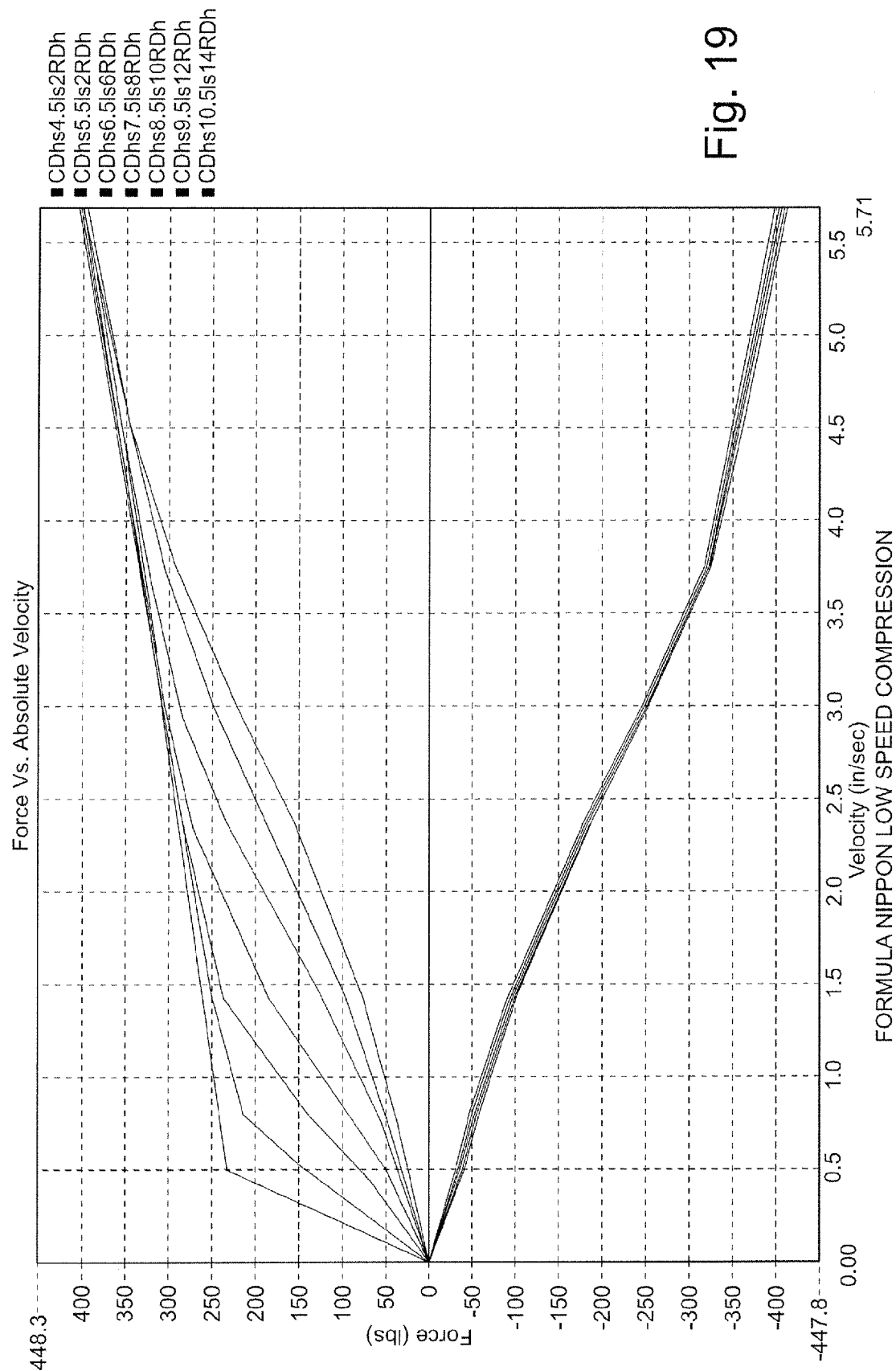
FIG. 19 shows a graph of the linear impelled module damper from FIG. 1, where the first adjustment for low speed compression is adjusted.

Referring to FIG. 19, a diagram of a Formula Nippon Low Speed Compression test is shown for a linear impelled module damper made according to the instant invention. In this diagram, Force vs. Absolute Velocity to compress a damper 10 is shown. In FIG. 19, only first adjustment 40 has been adjusted. As can be seen, the force required to compress damper 10 at low Absolute velocities (0.000 to approximately 1.000 in/sec), has been modified by the adjustment of first adjustment 40. This low speed compression control may be utilized for any results. For example, in a racecar, this low speed compression control may be utilized to control the chassis in inertial and aerodynamic inputs, i.e., forces put into the chassis downward into the wheels.

Figure 20:
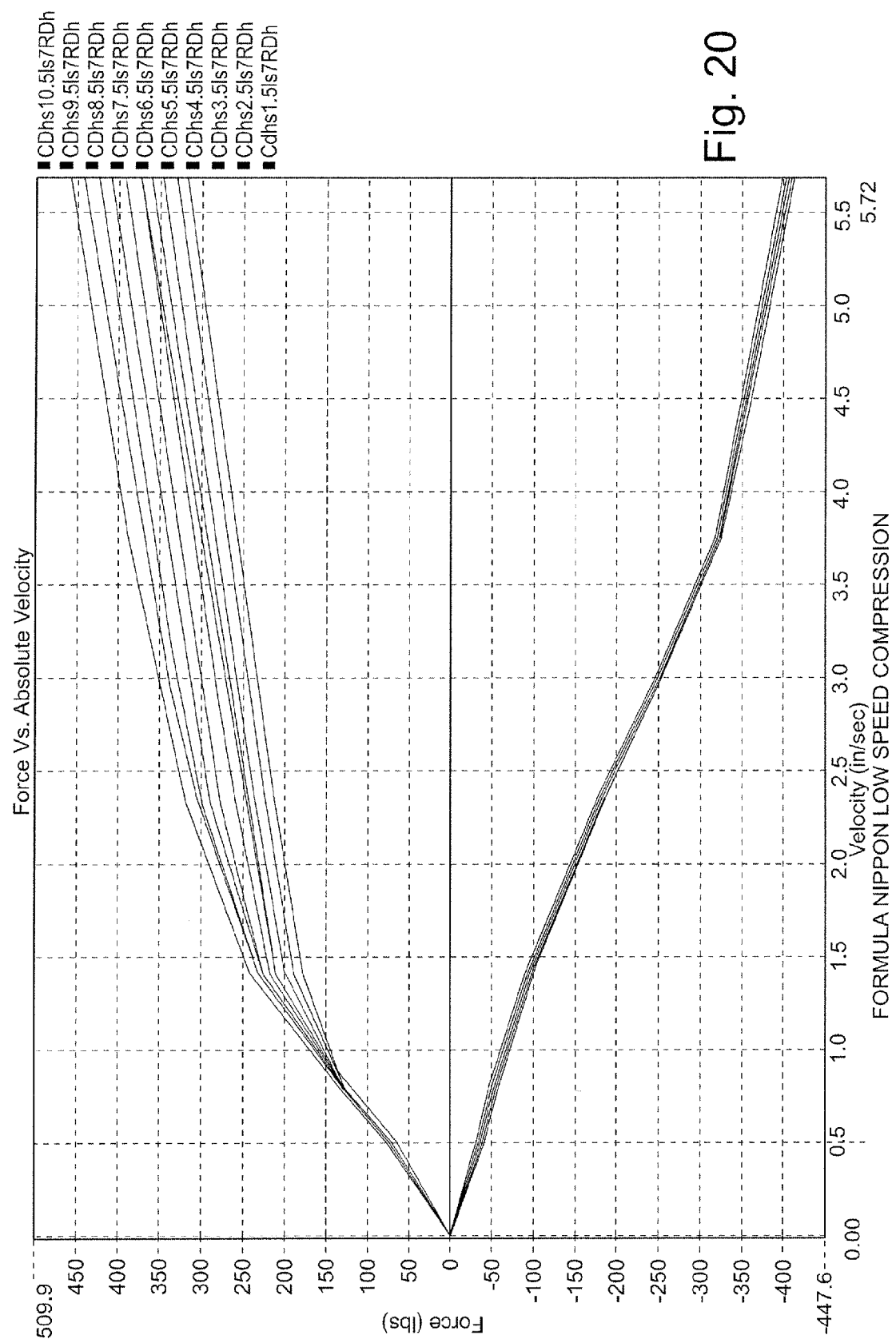
FIG. 20 shows a graph of the linear impelled module damper from FIG. 1, where the second adjustment for high speed compression is adjusted.

Referring to FIG. 20, a diagram of a Formula Nippon High Speed Compression test is shown for a linear impelled module damper 10 made and tested according to the instant invention. In this diagram, Force vs. Absolute Velocity to compress a damper 10 is shown. In FIG. 20, only second adjustment 46 has been adjusted. As can be seen, the force required to compress damper 10 at high Absolute velocities (approximately 1.000 in/sec and up), has been modified by the adjustment of second adjustment 46. This high speed compression control may be utilized for different results depending on the device damper 10 may be installed on. For example, in a racecar, this high speed compression control may be utilized to control inputs put into the wheel, i.e., bumps, curbs, and undulations in the track surface.

Figure 21:
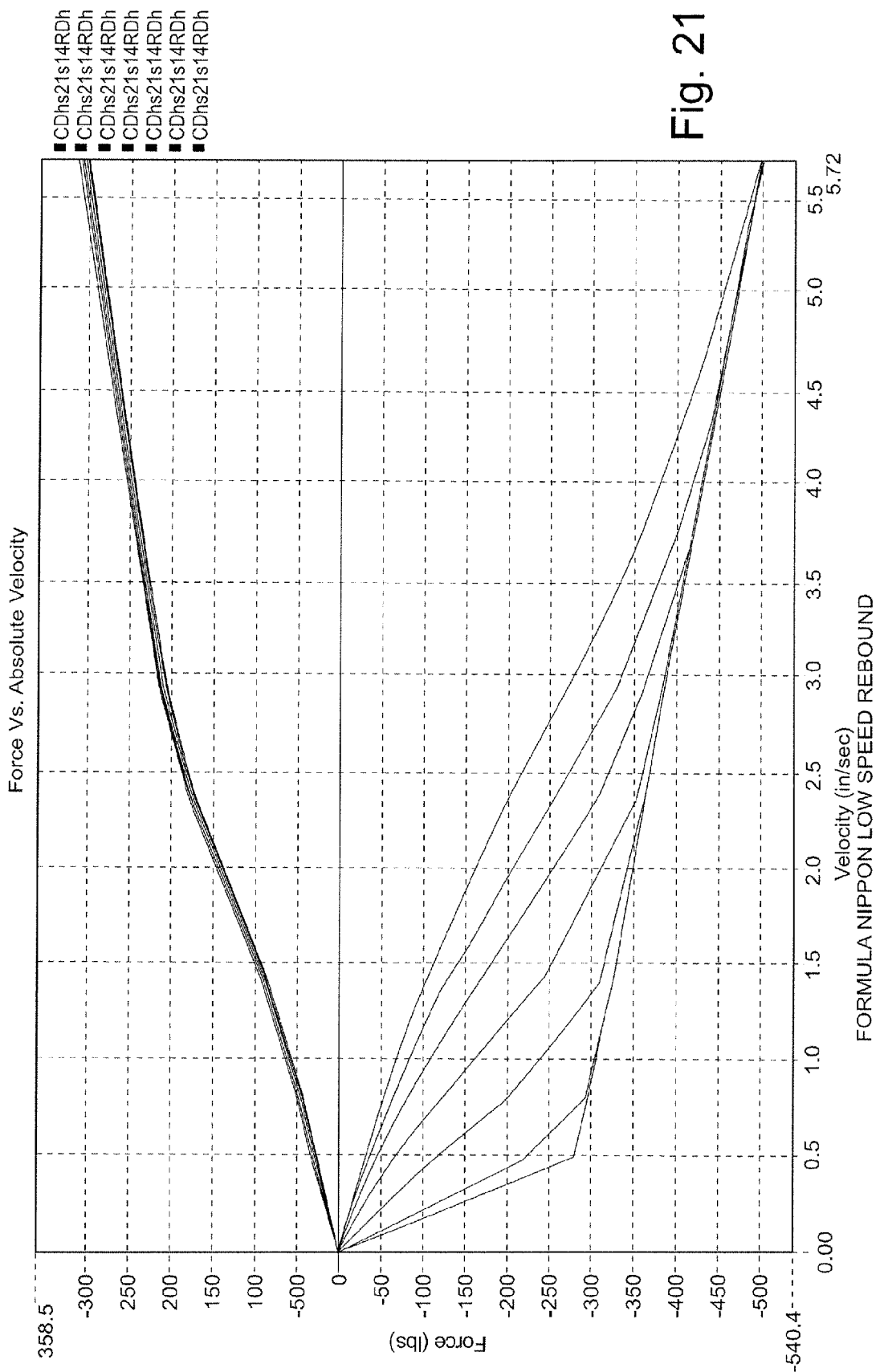
FIG. 21 shows a graph of the linear impelled module damper from FIG. 1, where the third adjustment for low speed rebound is adjusted.

Referring to FIG. 21, a diagram of a Formula Nippon Low Speed Rebound test is shown for a linear impelled module damper 10 made and tested according to the instant invention. In this diagram, Force vs. Absolute Velocity to extend (rebound) a damper 10 is shown. In FIG. 21, only third adjustment 52 has been adjusted. As can be seen, the force required to extend damper 10 at low Absolute velocities (0.000 to approximately 1.000 in/sec), has been modified by the adjustment of third adjustment 52. This low speed rebound control may be utilized for different results depending on the device damper 10 may be installed on. For example, in a racecar, this low speed rebound control may be utilized to control transitional motion, i.e., platform, turning in, exiting, and some degree of pitch.

Figure 22:
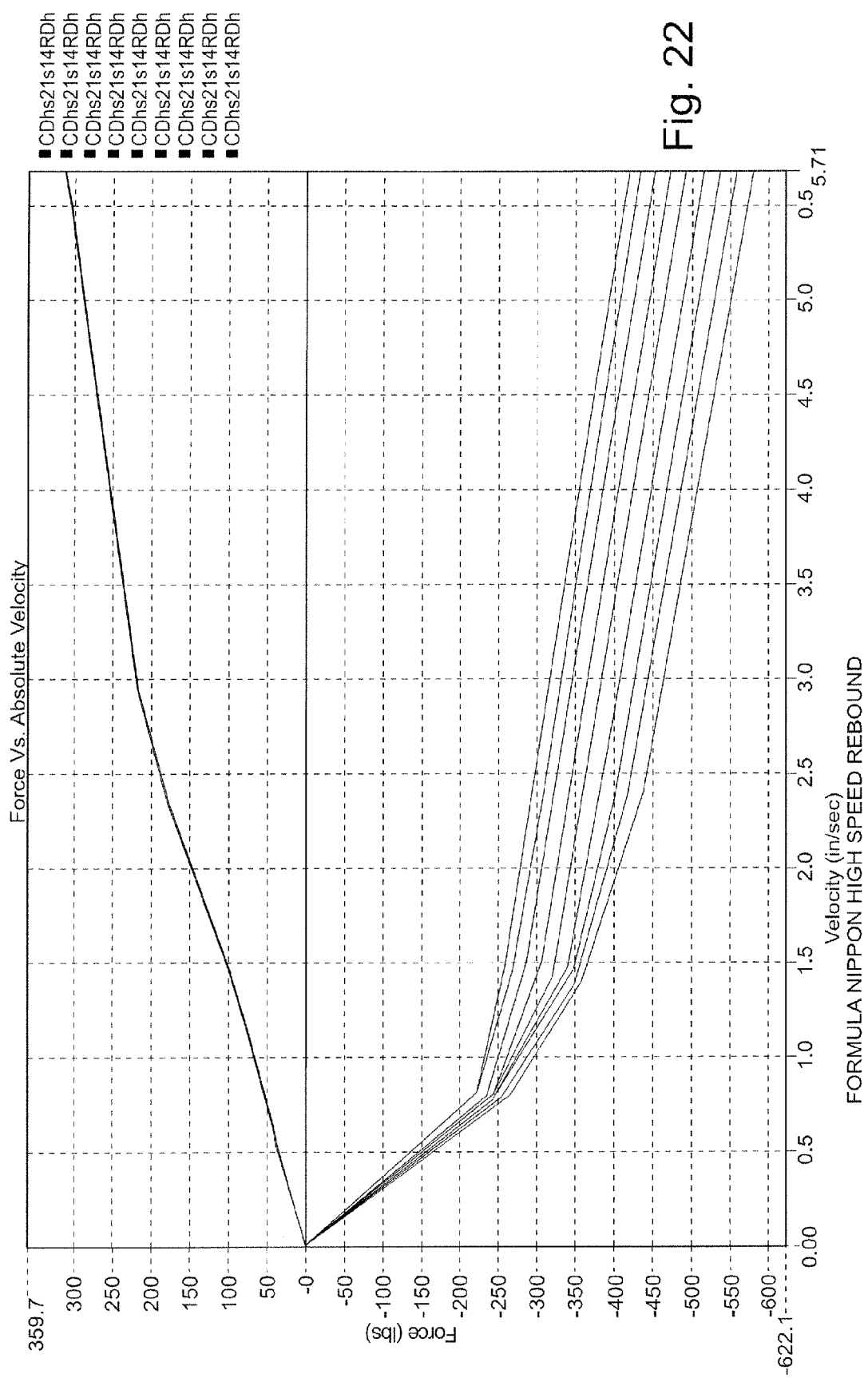
FIG. 22 shows a graph of the linear impelled module damper from FIG. 1, where the fourth adjustment for high speed rebound is adjusted.

Referring to FIG. 22, a diagram of a Formula Nippon High Speed Rebound test is shown for a linear impelled module damper 10 made and tested according to the instant invention. In this diagram, Force vs. Absolute Velocity to extend (rebound) a damper 10 is shown. In FIG. 22, only fourth adjustment 58 has been adjusted. As can be seen, the force required to extend damper 10 at high Absolute velocities (approximately 1.000 in/sec and above), has been modified by the adjustment of fourth adjustment 58. This high speed rebound control may be utilized for different results depending on the device damper 10 may be installed on. For example, in a racecar, this high speed rebound control may be utilized to control braking, and larger chassis motions brought on by larger wheel inputs and mass heave and pitch motion.

The present invention may be embodied in other forms without departing from the spirit and the essential attributes thereof, and, accordingly, reference should be made to the appended claims, rather than to the foregoing specification, as indicated in the scope of the invention.

The invention claimed is:

1. A linear impelled module damper comprising:
    a hollow cylinder having an inner body, an outer body, and a channel between said inner body and said outer body;
    said hollow cylinder having a sealed first end and a sealed second end;
    a piston movable within said hollow cylinder dividing said hollow cylinder into a compression chamber and a rebound chamber;
    said channel communicating with said rebound chamber through at least one hole in said rebound chamber;
    a compression extension cylinder being rigidly fixed to said hollow cylinder approximate to said sealed second end on one end, and having a compression mount attached to the other end;
    said compression extension cylinder including an air valve being adapted to allow a piston rod to move in and out of said compression extension cylinder;
    said piston rod being movable through said sealed first and second ends of said hollow cylinder;
    said piston rod including a rebound mount on one end and extending into said compression extension cylinder on the other;
    said piston being rigidly fixed to said piston rod within said hollow cylinder; and
    a removable adjustment module communicating with a compression bleed circuit and a rebound bleed circuit of said hollow cylinder;
    said compression bleed circuit being adapted to control the hydraulic fluid displaced from said compression chamber; and
    said rebound bleed circuit being adapted to control hydraulic fluid displaced from said rebound chamber;
    said removable adjustment module being attached to said linear impelled module damper by two connections, a compression connection and a rebound connection;
    said compression connection and said rebound connection being quick disconnect dry break connections, whereby, said removable adjustment module being removable from said linear impelled module damper by a quick disconnect dry break;
    a rebound mount for attachment to the wheels or suspension of a vehicle;
    a compression mount for attachment to the chassis of a vehicle;
    whereby, when said linear impelled module damper being installed on a vehicle with said compression mount being attached to the wheels or suspension and said rebound mount being attached to the chassis of a vehicle, said removable adjustment module being removable from said linear impelled module damper by disconnecting said quick disconnect dry breaks of said compression connection and said rebound connection.

2. The linear impelled module damper of claim 1 wherein said compression chamber and said rebound chamber being approximately equal.

3. The linear impelled module damper of claim 1 wherein said piston rod including:

a first piston rod being movable through said sealed first end into said rebound chamber, said first piston rod being connected to said piston on one end and a compression mount on the other end; and a second piston rod being moveable through said sealed second end and into said compression chamber, said second piston rod being connected to said piston on one end and extending into said compression extension cylinder on the other.

4. The linear impelled module damper of claim 3 where said first piston rod and said second piston rod having approximately equal diameters.

5. The linear impelled module damper of claim 3 wherein said first piston rod having a slightly smaller diameter than said second piston rod, whereby, when a piston rod pressure differential occurs, said compression chamber remains equal to said rebound chamber.

6. The linear impelled module damper of claim 1 wherein:
said compression bleed circuit including the hydraulic fluid flowing into and out of said compression chamber through direct feed; and
said rebound bleed circuit including the hydraulic fluid flowing into and out of said rebound chamber through said hole and said channel.

7. The linear impelled module damper of claim 1 further including:
a first adjustment for adjusting high speed flow through said compression bleed circuit;
a second adjustment for adjusting low speed flow through said compression bleed circuit;
a third adjustment for adjusting high speed flow through said rebound bleed circuit; and
a fourth adjustment for adjusting low speed flow through said rebound bleed circuit.

8. The linear impelled module damper of claim 7 wherein said first adjustment including a compression spring communicating with a first opening in said compression bleed circuit.

9. The linear impelled module damper of claim 7 wherein said second adjustment including a compression tapered needle communicating with a second opening in said compression bleed circuit.

10. The linear impelled module damper of claim 7 wherein said third adjustment including a rebound spring communicating with a third opening in said rebound bleed circuit.

11. The linear impelled module damper of claim 7 wherein said fourth adjustment including a rebound tapered needle communicating with a fourth opening in said rebound bleed circuit.

12. The linear impelled module damper of claim 7 wherein said removable adjustment module housing said first, second, third and fourth adjustments.

13. A linear impelled module damper comprising:
a first adjustment for adjusting high speed flow through a compression bleed circuit;
a second adjustment for adjusting low speed flow through said compression bleed circuit;
a third adjustment for adjusting high speed flow through a rebound bleed circuit;
a fourth adjustment for adjusting low speed flow through said rebound bleed circuit; and
a removable adjustment module communicating with said compression and rebound bleed circuits, said removable adjustment module housing said first, second, third and fourth adjustments;
said removable adjustment module being attached to said linear impelled module damper by two connections, a compression connection and a rebound connection;
said compression connection and said rebound connection being quick disconnect dry break connections, whereby, said removable adjustment module being removable from said linear impelled module damper by a quick disconnect dry break;
a rebound mount for attachment to the wheels or suspension of a vehicle;
a compression mount for attachment to the chassis of a vehicle;
whereby, when said linear impelled module damper being installed on a vehicle with said compression mount being attached to the wheels or suspension and said rebound mount being attached to the chassis of a vehicle, said removable adjustment module being removable from said linear impelled module damper by disconnecting said quick disconnect dry breaks of said compression connection and said rebound connection.

14. The linear impelled module damper of claim 13 wherein said first adjustment including a compression spring communicating with a first opening in a compression bleed circuit.

15. The linear impelled module damper of claim 13 wherein said second adjustment including a compression tapered needle communicating with a second opening in a compression bleed circuit.

16. The linear impelled module damper of claim 13 wherein said third adjustment including a rebound spring communicating with a third opening in said rebound bleed circuit.

17. The linear impelled module damper of claim 13 wherein said fourth adjustment including a rebound tapered needle communicating with a fourth opening in said rebound bleed circuit.

18. The linear impelled module damper of claim 13 further comprising:
a compression chamber;
a rebound chamber;
said compression chamber and said rebound chamber being approximately equal;
a compression bleed circuit being adapted to control the hydraulic fluid displaced from said compression chamber; and
a rebound bleed circuit being adapted to control the hydraulic fluid displaced from said rebound chamber.

19. A linear impelled module damper comprising:
a hollow cylinder having a sealed first end and a sealed second end;
a piston movable within said hollow cylinder dividing said hollow cylinder into a compression chamber and a rebound chamber;
a compression extension cylinder being rigidly fixed to said hollow cylinder approximate to said sealed second end on one end, and having a compression mount affixed to the other end for attachment to the chassis of a vehicle;
a first piston rod being movable through said sealed first end into said compression chamber, said first piston rod being connected to said piston on one end and a rebound mount on the other end for attachment to the wheels or suspension of a vehicle;
a second piston rod being moveable through said sealed second end and into said rebound chamber, said second piston rod being connected to said piston on one end and extending into said compression extension cylinder on the other;
said first piston rod and said second piston rod having approximately equal diameters;

said compression chamber and said rebound chamber being approximately equal;
a compression bleed circuit being adapted to control the hydraulic fluid displaced from said compression chamber;
a rebound bleed circuit being adapted to control the hydraulic fluid displaced from said rebound chamber;
a first adjustment for adjusting high speed flow through said compression bleed circuit including a compression spring communicating with a first opening in said compression bleed circuit;
a second adjustment for adjusting low speed flow through said compression bleed circuit including a compression tapered needle communicating with a second opening in said compression bleed circuit;
a third adjustment for adjusting high speed flow through said rebound bleed circuit including a rebound spring communicating with a third opening in said rebound bleed circuit;
a fourth adjustment for adjusting low speed flow through said rebound bleed circuit including a rebound tapered needle communicating with a fourth opening in said rebound bleed circuit;
a removable adjustment module communicating with said compression and rebound bleed circuits of said hollow cylinder, said removable adjustment module housing said first, second, third and fourth adjustments;
said removable adjustment module being attached to said linear impelled module damper by two connections, a compression connection and a rebound connection;
said compression connection and said rebound connection being quick disconnect dry break connections, whereby, said removable adjustment module being removable from said linear impelled module damper by a quick disconnect dry break;
whereby, when said linear impelled module damper being installed on a vehicle with said compression mount being attached to the wheels or suspension and said rebound mount being attached to the chassis of a vehicle, said removable adjustment module being removable from said linear impelled module damper by disconnecting said quick disconnect dry breaks of said compression connection and said rebound connection.

* * * * *